(12) United States Patent
Yushin et al.

(10) Patent No.: US 12,155,035 B2
(45) Date of Patent: *Nov. 26, 2024

(54) ELECTRODES INCLUDING SOLID ELECTROLYTE IONICALLY INTERCONNECTING POROUS ACTIVE MATERIAL PARTICLES AND METHODS OF FABRICATING THE SAME

(71) Applicant: Sila Nanotechnologies, Inc., Alameda, CA (US)

(72) Inventors: Gleb Yushin, Atlanta, GA (US); Bogdan Zdyrko, Atlanta, GA (US)

(73) Assignee: SILA NANOTECHNOLOGIES, INC., Alameda, CA (US)

( * ) Notice: Subject to any disclaimer, the term of this patent is extended or adjusted under 35 U.S.C. 154(b) by 297 days.

This patent is subject to a terminal disclaimer.

(21) Appl. No.: 17/736,830

(22) Filed: May 4, 2022

(65) Prior Publication Data

US 2022/0263128 A1 Aug. 18, 2022

Related U.S. Application Data

(63) Continuation of application No. 16/383,325, filed on Apr. 12, 2019, now Pat. No. 11,362,365, which is a continuation of application No. 14/107,941, filed on Dec. 16, 2013, now Pat. No. 10,263,279.

(60) Provisional application No. 61/737,541, filed on Dec. 14, 2012.

(51) Int. Cl.
*H01M 10/0562* (2010.01)
*H01M 4/36* (2006.01)
*H01M 10/052* (2010.01)
*H01M 10/0525* (2010.01)
*H01M 10/054* (2010.01)

(52) U.S. Cl.
CPC ....... *H01M 10/0562* (2013.01); *H01M 4/366* (2013.01); *H01M 10/052* (2013.01); *H01M 10/0525* (2013.01); *H01M 10/054* (2013.01)

(58) Field of Classification Search
CPC .............. H01M 4/366; H01M 10/052; H01M 10/0525; H01M 10/054
USPC .............................. 429/218.1, 304, 306, 314
See application file for complete search history.

(56) References Cited

U.S. PATENT DOCUMENTS 11,362,365 B2 * 6/2022 Yushin ................ H01M 10/054

* cited by examiner

*Primary Examiner* — Sean P Cullen
(74) *Attorney, Agent, or Firm* — MUNCY, GEISSLER, OLDS & LOWE, P.C.; Daniel Podhajny

(57) ABSTRACT

A metal or metal-ion battery composition is provided that comprises anode and cathode electrodes along with an electrolyte ionically coupling the anode and the cathode. At least one of the electrodes includes active material particles provided to store and release ions during battery operation. Each of the active material particles includes internal pores configured to accommodate volume changes in the active material during the storing and releasing of the ions. The electrolyte comprises a solid electrolyte ionically interconnecting the active material particles.

38 Claims, 19 Drawing Sheets

ELECTRODES INCLUDING SOLID ELECTROLYTE IONICALLY INTERCONNECTING POROUS ACTIVE MATERIAL PARTICLES AND METHODS OF FABRICATING THE SAME

CROSS REFERENCE TO RELATED APPLICATIONS

The present application for patent is a continuation of U.S. patent application Ser. No. 16/383,325 entitled "ELECTRODES FOR ENERGY STORAGE DEVICES WITH SOLID ELECTROLYTES AND METHODS OF FABRICATING THE SAME" filed on Apr. 12, 2019, which is a continuation of U.S. patent application Ser. No. 14/107,941 entitled "ELECTRODES FOR ENERGY STORAGE DEVICES WITH SOLID ELECTROLYTES AND METHODS OF FABRICATING THE SAME" filed on Dec. 16, 2013, which claims priority to Provisional Application No. 61/737,541 entitled "ELECTRODES FOR ENERGY STORAGE DEVICES WITH SOLID ELECTROLYTES AND METHODS OF FABRICATING THE SAME" filed on Dec. 14, 2012, each of which is expressly incorporated by reference herein in its entirety.

BACKGROUND

Field

The present disclosure relates generally to energy storage devices, and more particularly to metal and metal-ion battery technology and the like.

Background

Owing in part to their relatively high energy densities, light weight, and potential for long lifetimes, advanced metal and metal-ion batteries such as lithium-ion (Li-ion) batteries are desirable for a wide range of consumer electronics. In many applications, Li-ion batteries have essentially replaced nickel-cadmium and nickel-metal-hydride batteries. Despite their increasing commercial prevalence, however, further development of metal-ion batteries is needed, particularly for potential applications in low- or zero-emission hybrid-electrical or fully-electrical vehicles, consumer electronics, energy-efficient cargo ships and locomotives, aerospace devices, and power grids. Such high-power applications will require electrodes with higher specific capacities than those used in currently-existing Li-ion batteries.

One of the areas in need of further development is the battery electrolyte. Several types of electrolytes can be used in batteries at moderate temperatures (e.g., below about 120° C.), including liquid organic electrolytes, ionic liquids, organic-polymer solid electrolytes, inorganic solid electrolytes, and mixed electrolytes. Common examples of inorganic solid electrolytes for Li-ion batteries include sulfide-based electrolytes (such as $Li_2S$—$P_2S_5$, $Li_2S$—$Ga_2S_3$—$GeS_2$, $Li_2S$—$SiS_2$, etc.), oxide-based electrolytes (such as Li—La—Ti—O garnet, Li—La—Ta—O garnet, Li—Si—O glass, Li—Ge—O glass, $Li_9SiAlO_8$, etc.), mixed sulfide-oxide electrolytes (such as $Li_2S$—$SiS_2$—$Li_4SiO_4$, LiI—$La_2O_2S$—$La_2O_2S_2$, etc.) and others. There are several advantages to using inorganic solid electrolytes in batteries operating at moderate temperatures, including their broad operational temperature windows, relative safety, reduced irreversible capacity losses, higher operational voltage windows, longer cycle life, and production compatibility.

Nevertheless, the use of inorganic solid electrolytes in particular has proven difficult to implement in practice and conventional commercial batteries operating at moderate or room temperatures almost never use inorganic solid electrolytes. This is because the conventional procedures for the formation of electrodes with inorganic solid electrolytes are not very efficient and suffer from several limitations, which reduce the current effectiveness and practicality of inorganic solid electrolytes.

These conventional procedures used to form electrodes with inorganic solid electrolytes typically involve the following lengthy (and often expensive and/or time-consuming) steps: (i) thorough mixing (or milling) powders of active material with conductive carbon powder and with solid electrolyte particles to form a homogeneous mass; (ii) casting the resultant mass on a flat substrate (such as a metal current collector foil); and (iii) annealing at elevated temperatures (and typically under pressure) in an inert environment to cause sintering of all the particles and the formation of an ionically conductive composite with electrically connected active particles. However, in order for the active particles to be electrically connected, high amounts of conductive carbon additive powder is used (sometimes as high as 30% or more). Since such powder (if in the cathode) does not typically participate in energy (ion) storage, the high amount of carbon powder reduces the specific (per unit mass) and volumetric (per unit volume) capacities of the electrode. In comparison, battery electrodes produced for use with liquid electrolytes commonly contain as little as 2-5% conductive carbon additives.

Similarly, in order to ensure that all active particles are ionically connected in the sintered composite via the solid electrolyte, the amount of solid electrolyte is often increased substantially (sometimes as high as 50% by volume or more). In comparison, commercial battery electrodes are typically infiltrated with as little as 25% by volume of the electrolyte or even less. This also contributes to the lowering of the specific and volumetric capacities of the battery. In addition, in many cases the interface between the solid electrolyte and the active particles contains excessive voids, which undesirably increases the polarization resistance and thus lowers the power performance of the battery (while also increasing the charging and discharging times).

Still further, the mixing and sintering of many metal-ion containing active anode particles (such as lithiated graphite or lithiated silicon for use in combination with Li-free cathodes in Li-ion batteries) must be performed in an inert (air-free) environment due to the high reactivity of such particles with air. The electrode fabrication equipment line (especially the one that includes mixing, casting, and annealing/sintering steps) occupies a large area. Sealing such equipment from air therefore becomes very expensive, which significantly increases the electrode production cost. In addition, if voids remain in the electrode after sintering, they may provide paths for air to reach and react with the metal-ion containing active particles.

Accordingly, despite the advancements made in electrode materials, high capacity metal-ion batteries remain somewhat limited in their application and there remains a need for improved batteries, components, and other related materials and manufacturing processes.

SUMMARY

Embodiments disclosed herein address the above stated needs by providing improved battery components, improved batteries made therefrom, and methods of making and using the same.

A metal or metal-ion battery composition is provided that comprises anode and cathode electrodes along with an electrolyte ionically coupling the anode and the cathode. At least one of the electrodes includes active material particles provided to store and release ions during battery operation. Each of the active material particles includes internal pores configured to accommodate volume changes in the active material during the storing and releasing of the ions. The electrolyte comprises a solid electrolyte ionically interconnecting the active material particles.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
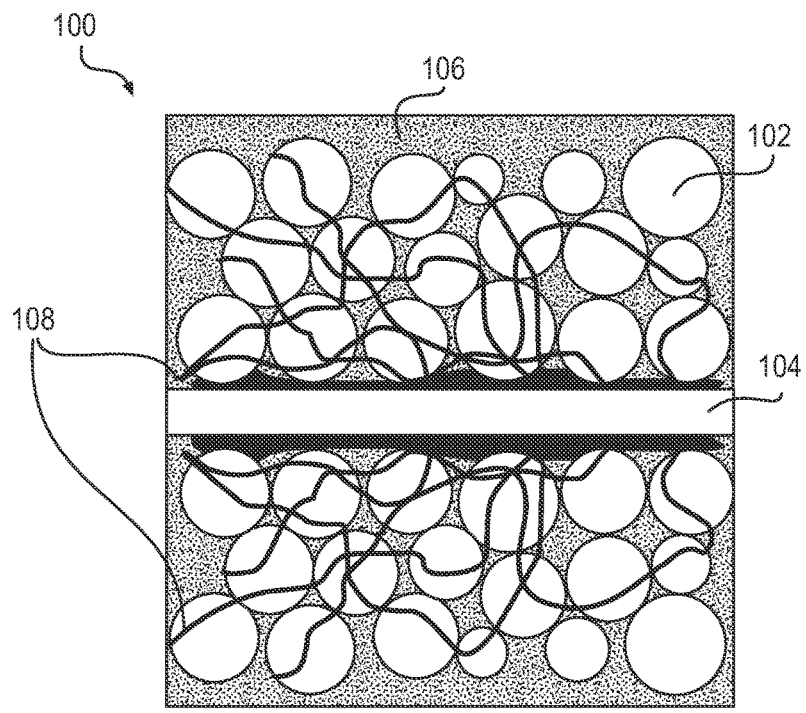
FIG. 1 illustrates an example of an electrode filled with a solid electrolyte for a metal or metal-ion battery composition according to various embodiments.

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details.

In some examples below, active particles may be shown in a perfectly spherical shape for illustration purposes. It is to be appreciated, however, that the shape of such particles may be somewhat or even highly distorted or irregular in some applications. In addition, several examples may be provided below in the context of lithium or Li-ion chemistry. It is to be appreciated, however, that other metal and metal-ion chemistries (such as Na, Mg, Al, Ca, etc.) may be utilized in various other applications.

As discussed in the background above, despite several potential advantages, the use of inorganic solid electrolytes in metal and metal-ion batteries has heretofore proven impractical for conventional commercial batteries. In addition, the inventors have found that another serious limitation affecting solid electrolytes is their conventional failure when used in combination with a high-capacity electrode material that changes volume during battery operation (i.e., during insertion and extraction of ions). Such material expansion may induce cracks within the solid electrolyte and form voids or defects at the active material/solid electrolyte interfaces. This disrupts the electrical and ionic connectivity of the electrode particles, and leads to rapid battery failure.

Structures and techniques are accordingly provided herein that address the conventional limitations and barriers for such batteries by providing for a novel architecture of solid-electrolyte-containing electrodes with improved mechanical properties as well as a reduced content of conductive carbon and solid electrolyte. The architecture provided facilitates the use of high capacity active materials without the electrode failure typically caused by the associated change in volume experienced during battery operation (i.e., during ion insertion and extraction). The techniques further provide corresponding, often low-cost methods of producing such electrodes, as well as methods of producing solid-electrolyte-containing electrodes with metal-containing low-voltage anodes (such as lithiated graphite or lithiated silicon-based anodes for Li-ion batteries, or lithium foil comprising anodes for rechargeable Li batteries).

In this way, various embodiments of the invention facilitated by the disclosure herein allow the advantages of inorganic solid electrolytes to be more fully realized than has been heretofore possible. For example, various embodiments advantageously provide for a broad operational temperature window as compared to conventional designs. In contrast to the majority of organic electrolytes, inorganic solid electrolytes do not induce rapid degradation in batteries when operating at temperatures above or near +60° C. In addition, many solid inorganic electrolytes are capable of operating in batteries at relatively low temperatures of below or near −20° C.

Various embodiments also advantageously provide improved safety as compared to conventional designs. The use of solid electrolytes allows for safer operation of batteries. For example, in contrast to liquid organic electrolytes, solid electrolytes prevent the growth of metal (such as Li) dendrites during battery operation, which may lead to catastrophic failure of the battery and even fire. In further contrast to liquid organic electrolytes, solid inorganic electrolytes do not leak, or suffer from high flammability.

Various embodiments also advantageously provide reduced irreversible capacity losses as compared to conventional designs. Organic electrolytes commonly suffer from decomposition at the surface of their active particles (e.g., via reduction on the anode and oxidation on the cathode). Such decomposition reactions induce the highly undesirable irreversible losses of capacity during the first and subsequent cycles. In contrast, solid inorganic electrolytes may significantly reduce (or eliminate) the irreversible capacity losses during the first and subsequent cycles.

Various embodiments also advantageously provide a higher operational voltage window as compared to conventional designs. The majority of organic electrolytes suffer from oxidation at above or near 4.5 V vs. Li/Li+. In contrast, selected inorganic electrolytes are stable even when exposed to potentials above 7 V vs. Li/Li+. This opens the door for using high voltage cathodes in certain batteries, which may significantly enhance a given battery's energy density (energy stored per unit volume).

Various embodiments also advantageously provide longer cycle life as compared to conventional designs. In some battery chemistries, liquid organic electrolytes dissolve intermediate reaction products (for example, in S-based cathodes), which leads to rapid battery degradation. In some battery chemistries, impurities in organic electrolytes or decomposition products of organic electrolytes (such as HF) dissolve active materials (such as oxide-based active materials), which also leads to battery degradation. By contrast, inorganic solid electrolytes do not typically suffer from such limitations.

Various embodiments also advantageously provide improved production compatibilities with metal-containing, low-voltage anodes (such as Li-containing, low-voltage anodes for Li-ion batteries, Mg-containing, low-voltage anodes for Mg-ion batteries, or Na-containing, low-voltage anodes for Na-ion batteries) as compared to conventional designs. The use of metal-ion-containing, low-voltage anodes (such as lithiated graphite, lithiated silicon, lithiated tin, lithiated bismuth, lithiated lead, lithiated antimony, lithium alloys, or lithium foil anodes for Li-ion and Li batteries) allows one to use metal-ion free cathodes (such as sulfur-based cathodes or various non-lithium halide-based cathodes for metal-ion and metal batteries), which may be advantageous for some applications due to the simplicity of producing such cathodes with a desired morphology and microstructure. Conventional battery construction does not utilize metal-ion-containing, low-voltage anodes because of the high reactivity of such anodes with air in battery assembling facilities. However, if lithiated graphite or lithiated silicon, for example, is sealed from the surrounding air by solid inorganic electrolytes, their use or exposure to air (at least dry air) becomes feasible.

Several example battery structures and corresponding production processes according to select example embodiments will now be described with reference to FIGS. 1-39.

FIG. 1 illustrates an example of an electrode filled with a solid electrolyte for a metal or metal-ion battery composition according to various embodiments. As shown, an electrode 100 (e.g., an anode or a cathode) may be composed of a collection of active (ion hosting) material particles 102 agglomerated onto a current collector 104 or the like, as appropriate for a given application, and ionically interconnected by a solid electrolyte 106. For increased electrical connectivity, optional carbon additives 108 (e.g., carbon nanofibers, carbon nanotubes, graphene flakes, exfoliated graphite, or carbon nanoparticles) may be intermixed throughout the active material particles 102 as well. The spherical shape of the active material particles 102 is shown for illustration purposes only, but may be beneficial for some applications. The active material particles 102 are provided to store and release ions during battery operation.

Figure 2:
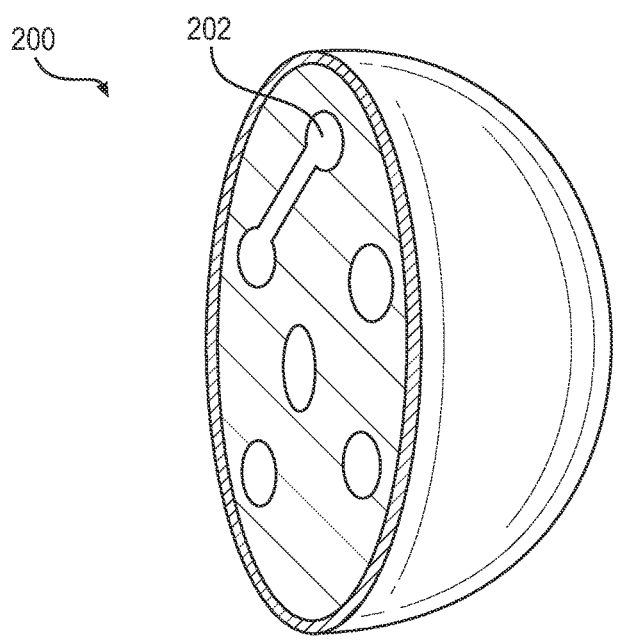
FIG. 2 is a cut-away perspective view illustrating the constitution of an example active material particle that may be employed in the design of FIG. 1.

FIG. 2 is a cut-away perspective view illustrating the constitution of an example active material particle that may be employed in the design of FIG. 1. As shown, the active material particle 200 may include one or several internal pores 202, which may exist in isolated or interconnected form.

The inventors have discovered that in some cases the difference in the thermal expansion coefficient (TEC) between active particles and the electrolyte may induce stresses within the electrolyte-infiltrated electrode upon cooling. Such stresses may lead to the undesirable formation of cracks or voids within the electrode and at the active particle/electrolyte interfaces. To improve the electrode quality, the active particles may be produced with inner pores as shown here in FIG. 2. In the case where the TEC of the electrolyte is larger than the TEC of the particles, compression of such pores releases some of the stresses and minimizes any formation of defects within the electrode.

Accordingly, in various embodiments, each of the active material particles may include such internal pores configured to accommodate volume changes in the active material during the storing and releasing of the ions. When the active material is a high capacity material that changes volume by more than about 10% during insertion and extraction of metal ions (e.g., $Li^+$, $Na^+$, or $Mg^{2+}$ ions), the internal porosity of the active particles can be used to accommodate these volume changes so that charge/discharge cycles do not cause failure of the particle/solid electrolyte interface, and do not induce formation of cracks in the solid electrolyte. The overall porosity can be optimized to maximize the volumetric capacity, while avoiding the critical stresses that cause rapid composite failure or fatigue during battery cycling. In some applications, when relatively brittle solid electrolytes are used or when the interface between the electrode particles and the electrolyte is relatively weak, then the presence of internal pores may prove to be beneficial even when active material changes volume by less than 10%.

As will be discussed below in more detail with reference to FIGS. 3-13, the general constitution of each active material particle and its corresponding arrangement of internal pores may be implemented in a variety of ways.

Figure 3:
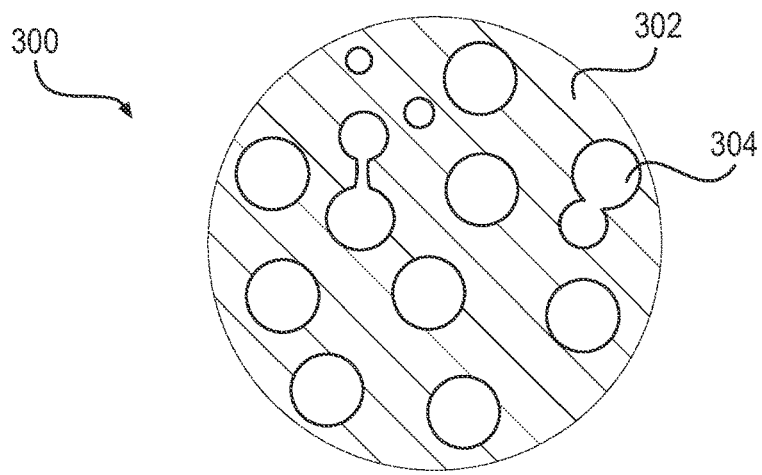
FIGS. 3-13 are cross-sectional illustrations of example active material particle designs.

FIG. 3 is a cross-sectional illustration of an example active material particle design. In this example, the active particle 300 is a plain porous particle composed of active material 302 and internal pores 304. Such porous particles may be produced by a so-called "bottom-up" approach, where the particles are built from smaller building blocks. One example to produce such porous active particles is utilization of an emulsion route. For example, active material in the form of nanoparticles can be dispersed in the suitable liquid. Binder (monomer or polymer) to keep the active nanoparticles together can be added to the liquid as well. Another type of additive (conductive particles, for example) can be dispersed jointly with the active material nanoparticles. Then, the suspension of the active particles with the binder may be emulsified in a second liquid immiscible with the first. The size of the porous particle may be controlled by the size of emulsion droplets. The droplets of the emulsion may then be solidified by solvent evaporation or monomer polymerization, yielding porous particles containing pores as shown in FIG. 3. In yet another example, porous particles may be produce by a so-called "balling" method, according to which smaller (for example, nanosize) particles are agglomerated together using a binder, which can be removed at later stages or transformed into a solid (e.g., a solid carbon, by carbonization of organic binders). In some examples, the particles can be further annealed in a controlled environment to induce sintering of individual nanoparticles. Another general route to produce such particles is a "top-down" approach where pores are induced in solid particles. In one example, the porous particles can be produced by first forming two or more compound-comprising particles, where one compound is leached out by dissolution or vaporization. In yet another example, porous particles may be produced by partial etching of solid particles.

Figure 4:
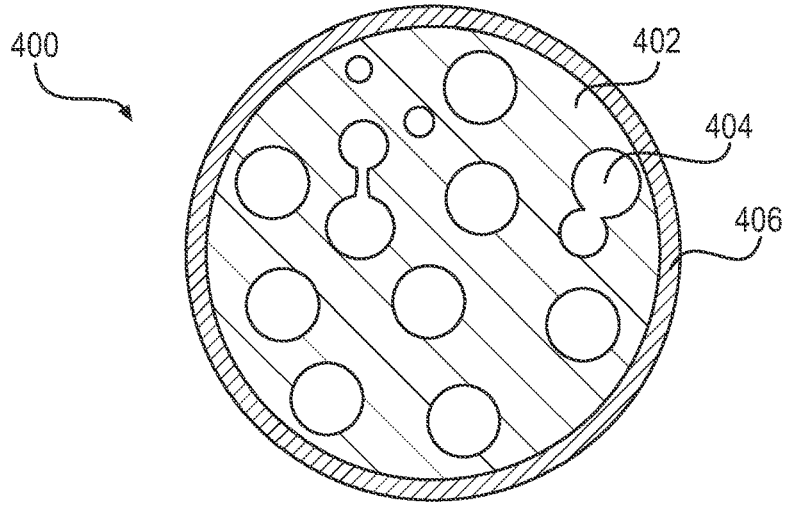

FIG. 4 is a cross-sectional illustration of another example active material particle design. In this example, the active particle 400 is a composite particle composed of active material 402, internal pores 404, and an outer shell 406 at least partially encasing the active material 402 and the internal pores 404. Such particles can be made from plain porous particles by deposition of a shell around them. The shell can be made, for example, by using vapor deposition methods (such as chemical vapor deposition, CVD, atomic layer deposition, ALD, and others), solution deposition methods (such as sol-gel, layer-by-layer deposition, precipitation, electroless deposition, electrodeposition, and others), reaction with other species in a gaseous or liquid environment, or by other methods. Once produced, the material can be annealed at elevated temperatures in a controlled environment to induce phase transformation, inter-diffusion, crystallization, or chemical reaction to improve mechanical or chemical properties of the shell, or improve its conductivity.

In some designs, electrode stability may be further enhanced by different types of "shell" coatings, such as an additional ion (e.g., a metal ion in the case of a metal-ion battery, such as Li ion in the case of a Li-ion battery) permeable thin layer coating (e.g., on the order of about 1-50 nm). Such shell(s) may improve the interface between the solid electrolyte and active particles, improving the electrolyte/particle adhesion and ion transport therethrough. In some applications, such shell(s) may also improve electrical connectivity between the individual particles or between the particles and the conductive carbon.

Figure 5:
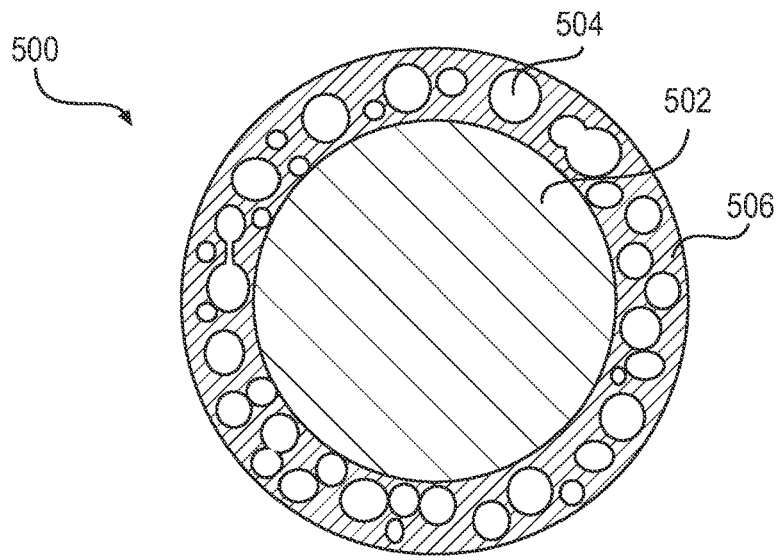

FIG. 5 is a cross-sectional illustration of another example active material particle design. This design is similar to that of FIG. 4, except that the pores are formed as part of the shell rather than inside of the shell within the active material. In particular, the active particle 500 is a composite particle composed of active material 502, internal pores 504, and an outer shell 506 at least partially encasing the active material 502 and the internal pores 504. Here, the internal pores 504 are partially encased by the shell 506 by being formed as part of the shell 506. The porous shell around the active particle can be made of various materials, including porous carbon. One example of forming a porous carbon shell includes precipitation polymerization of the monomer with active particles as seeds for polymer precipitation. The shell can be left as a polymer shell in the case of a conductive shell or can be carbonized by pyrolysis, leading to formation of porous carbon shell.

Figure 6:
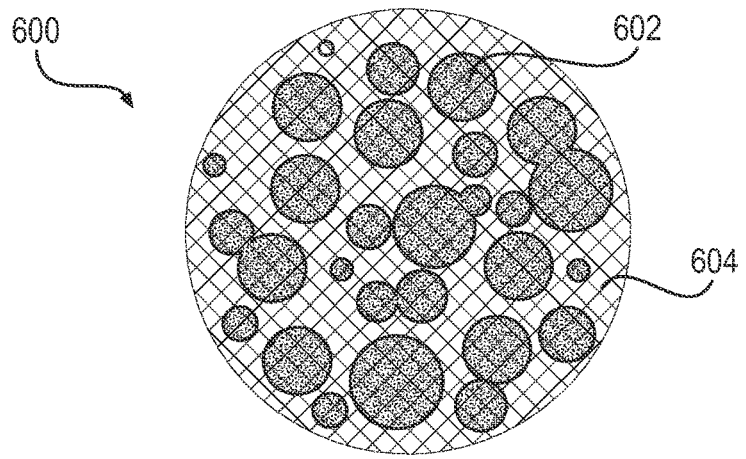

FIG. 6 is a cross-sectional illustration of another example active material particle design. In this example, the active particle 600 is a composite particle composed of active material 602 and a porous, electrically-conductive scaffolding matrix 604. The scaffolding matrix offers an alternative mechanism for introducing pores into the active particle structure. In this example, the active material 602 is illustrated as a collection of individual active (nano)particles. In general, the characteristic dimensions of the individual active (nano)particles (e.g., a diameter of individual active particles, in an idealized spherical case) may be in the range of about 0.1% to about 50% of the characteristic dimensions of the composite active particle 600. In some applications it may be advantageous for active (nano)particles to be of very small size, such as 1-10 nm in the smallest dimension, in order to enhance the reversible ion insertion and extraction rate. In some applications, it may be advantageous for the scaffold to be composed of very thin (e.g., less than 0.4 nm) interconnected fragments of electrically conductive material. Porous carbon with a high specific surface area (e.g., greater than 1000 $m^2/g$) is an example of such a scaffold.

Particles described in FIG. 6 can be made by infiltration of the active material into the porous electrically conductive scaffold, such as porous carbon. Porous carbon particles can be synthesized by carbonization from various organic and inorganic precursors. Organic precursors can be, for example, polymers. Polymer particles can be synthesized by emulsion, precipitation, dispersion, suspension, seeded polymerization, etc. The degree of particle porosity can be tuned by adding porogen (a pore forming agent) to the polymerization system, which will phase separate during polymerization. Additional porosity can be obtained by chemical or physical activation of the carbonized particle. Another example of porous carbon particle formation is hydrothermal carbonization, followed by activation. The active material can then be infiltrated into a porous carbon matrix using solution, suspension, or melt infiltration methods. In some applications, it may be advantageous to first infiltrate a precursor compound into the pores and then convert it into active material. In yet another example, the active material can be infiltrated into the porous matrix using vapor infiltration as well as chemical vapor deposition routes. An alternative way to introduce active material into the porous carbon particles is dispersion of the active material particles in the monomer or carbon precursor before carbonization.

Figure 7:
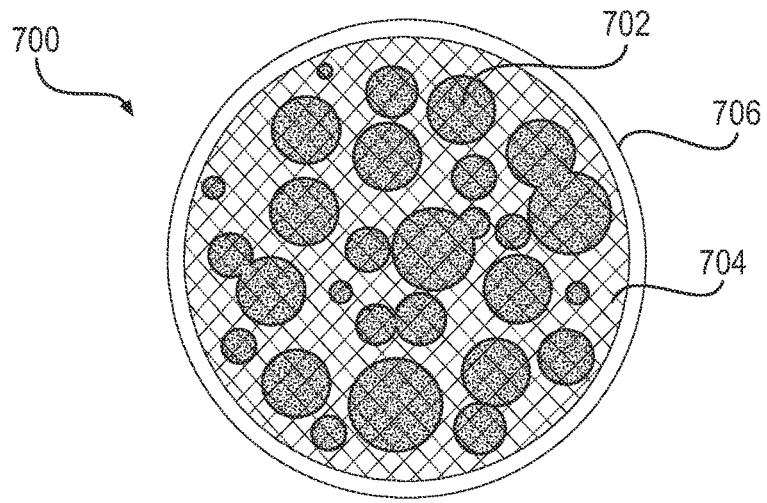

FIG. 7 is a cross-sectional illustration of another example active material particle design. This design is similar to that of FIG. 6, with a further outer shell as discussed above with reference to FIG. 4. In particular, the active particle 700 is a composite particle composed of active material 702 and a scaffolding matrix 704, at least partially encased by a shell 706. Such a shell can be made, for example, by using vapor deposition methods (such as chemical vapor deposition, CVD, atomic layer deposition, ALD, and others), solution deposition methods (such as sol-gel, layer-by-layer deposition, precipitation, and others), reaction with other species in a gaseous or liquid environment, or by other methods. Once produced, the material can be annealed at elevated temperatures in a controlled environment to induce phase transformation, inter-diffusion, crystallization, or chemical reaction to improve mechanical or chemical properties of the shell, or improve its conductivity.

Figure 8:
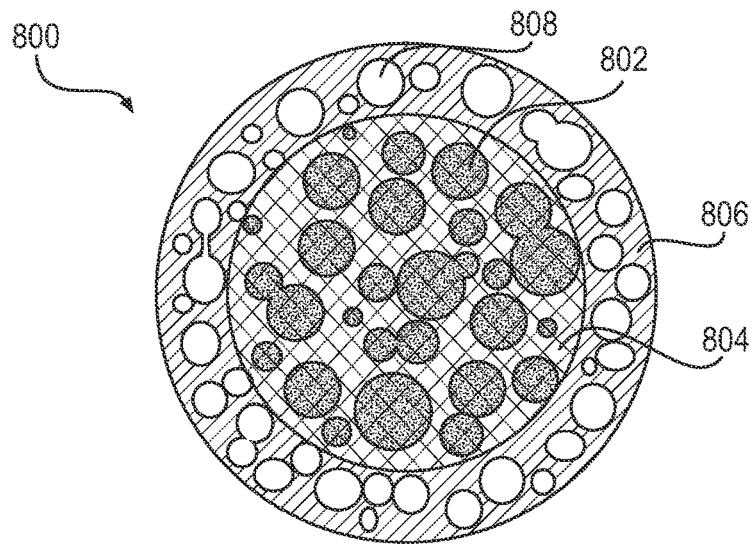

FIG. 8 is a cross-sectional illustration of another example active material particle design. This design is similar to that of FIG. 7, with the outer shell being itself made porous as discussed above with reference to FIG. 5. In particular, the active particle 800 is a composite particle composed of active material 802 and a scaffolding matrix 804, at least partially encased by a shell 806 including pores 808. To prepare such active particles, particles as described in FIG. 6 may, for example, be used as a starting material. The porous polymer shell around the active particles can be formed by precipitation polymerization of the monomer with active particles as seeds for polymer precipitation. The shell can be left as a polymer shell in the case of ionically and electronically conductive shells, or can be carbonized by pyrolysis into porous carbon. Porous shells can also be formed using other methods, including various "bottom-up" or "top-down" approaches. For example, by depositing porous coatings from the solution(s) (e.g., sol-gel deposition, electrodeposition and others), vapor deposition (such as chemical vapor deposition and others). In some cases, the shell can be produced comprising two compounds, where one compound is leached out by dissolution or vaporization. Alternatively, pores may be induced in such a coating by partial etching.

Figure 9:
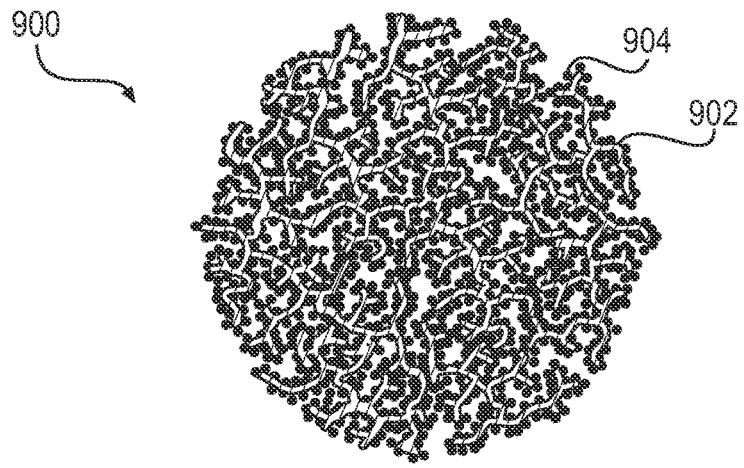

FIG. 9 is a cross-sectional illustration of another example active material particle design. In this example, the active particle 900 is a porous composite including a backbone 902 composed of connected nanoparticles of electrically conducting material (e.g., having a hierarchical or dendritic morphology) and coated with active material 904. Several methods may be utilized to form such particles. In one route, for example, smaller building blocks composed of branched backbone parts may first be coated with active material and then assembled into the porous composites using, for example, a "balling" technique. In another example, a fully assembled backbone particle composed of conductive material may be coated with or infiltrated with active material particles or active material coatings.

Figure 10:
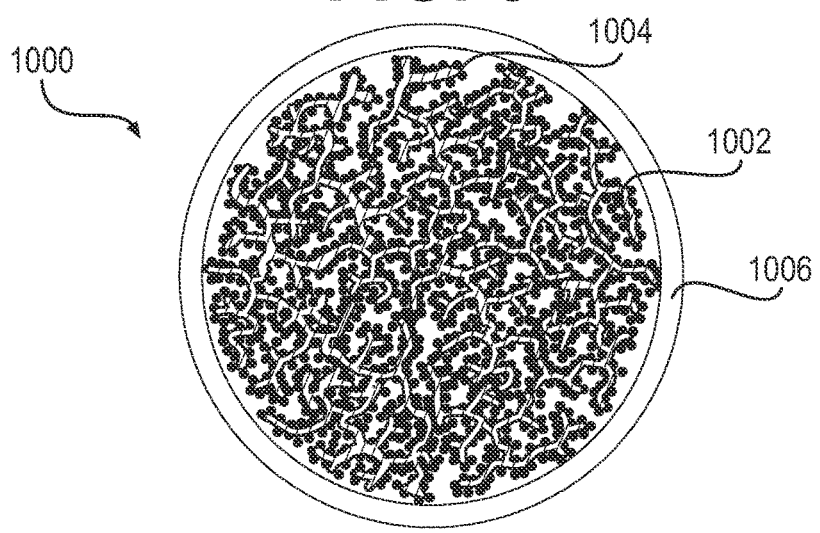

FIG. 10 is a cross-sectional illustration of another example active material particle design. This design is similar to that of FIG. 9, with a further outer shell as discussed above with reference to FIG. 4. In particular, the active particle 1000 includes a backbone 1002 coated with active material 1004, at least partially encased by a shell 1006.

Figure 11:
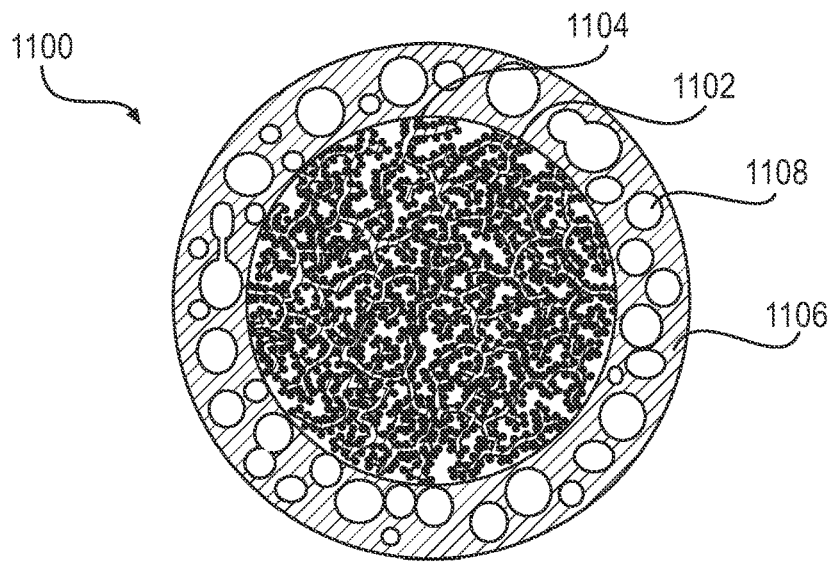

FIG. 11 is a cross-sectional illustration of another example active material particle design. This design is similar to that of FIG. 10, with the outer shell being itself made porous as discussed above with reference to FIG. 5. In particular, the active particle 1100 includes a backbone 1102 coated with active material 1104, at least partially encased by a shell 1106 including pores 1108.

Figure 12:
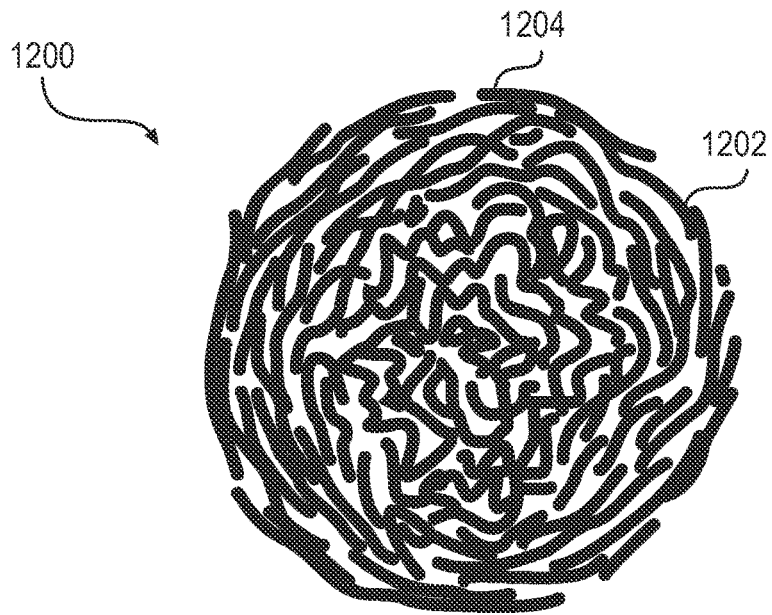

FIG. 12 is a cross-sectional illustration of another example active material particle design. In this example, the active particle 1200 is a porous composite including interconnected curved layers 1202 of electrically conductive material coated with active material 1204. The curved layers 1202 may be formed, for example, from a planar substrate backbone structured with a curved morphology, with the active material 1204 forming a continuous or substantially continuous film at least partially encasing the substrate backbone. An agglomeration of such layers creates pores in the resultant structure. One example material that may be used for such a substrate backbone is graphene. Graphene is an allotrope of carbon and may be structured in one or more atom-thick planar sheets or layers of $sp^2$-bonded carbon atoms densely packed in a honeycomb crystal lattice. The high surface area of graphene relative to its size (i.e., its specific surface area) allows rapid active material deposition, which may be advantageous for certain practical applications and manufacturing considerations. Graphene can be prepared by using exfoliation of graphite and other methods.

Figure 13:
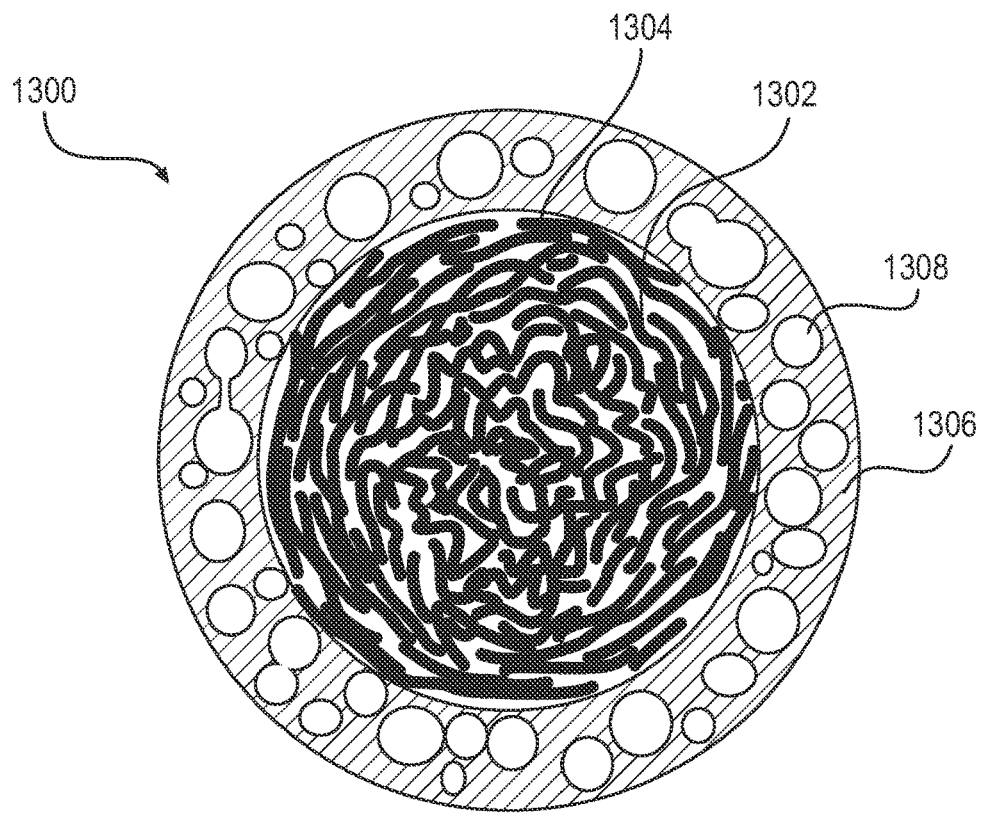

FIG. 13 is a cross-sectional illustration of another example active material particle design. This design is similar to that of FIG. 12, with a further outer shell as discussed above with reference to FIG. 4, with the outer shell being itself made porous as discussed above with reference to FIG. 5. In particular, the active particle 1300 includes interconnected curved layers 1302 of electrically conductive material coated with active material 1304, at least partially encased by a shell 1306 including pores 1308.

In view of the above example particle designs, it will be appreciated that the distribution of the inner pores within the active particles may vary. For example, in some applications, it may be advantageous to create sufficient porosity within the particle volume itself (e.g., as in the designs of FIGS. 3-4 and 6-13). In some applications, it may be advantageous to create pores in the outer shell of the particles (e.g., as in the designs of FIGS. 5, 8, 11, and 13). In some applications, it may be advantageous that the particle comprises a porous composite of porous scaffolding of electrically conductive material with nanoparticles of active material incorporated therein (e.g., as in the designs of FIGS. 5-7).

In some applications it may be advantageous to have a high roughness of the electrode particles or expose an electrically conductive scaffold to the electrode (as shown in FIGS. 6, 9, and 12). In this case, the interface area between the solid electrolyte and the electrode particles is increased and the interfacial resistance for the ion transport is diminished. Furthermore, this high interfacial area may strengthen the bond between the solid electrolyte and electrode particles, thereby increasing the mechanical strength of the assembly. In some applications, it may be preferable for this rough or porous surface of the electrode particles and the resulting electrode/electrolyte interface to be several (e.g., at least three) times higher than the geometrical surface area around the particles.

Turning to the electrolyte composition, the general constitution of the electrolyte may also be implemented in a variety of ways, including as a mixture of different electrolyte components.

Figure 14:
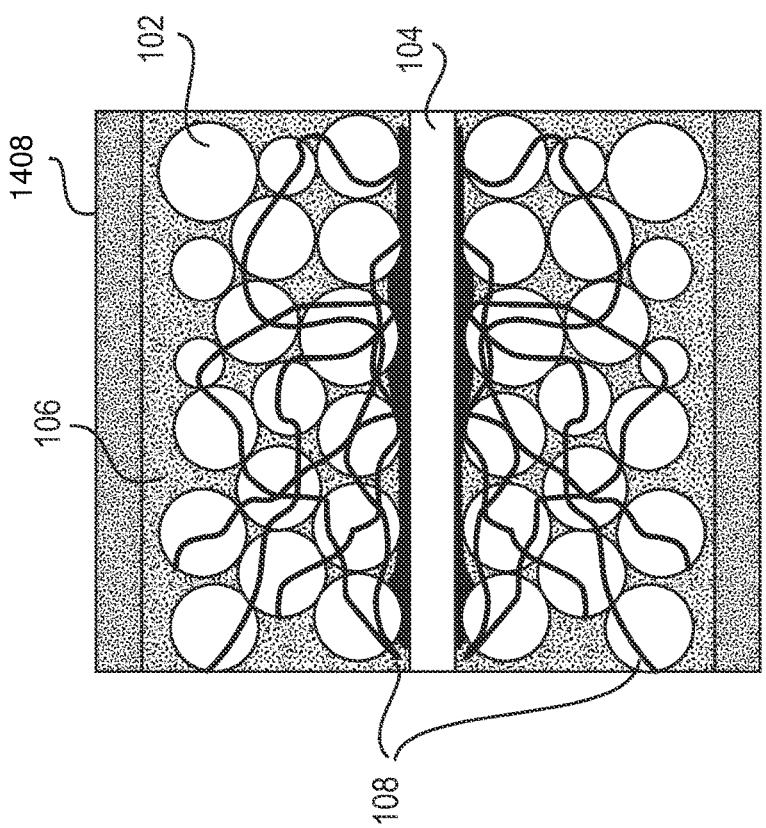

FIG. 14 illustrates an example metal or metal-ion battery composition having a composite electrolyte according to various embodiments. This design is similar to that of FIG. 1, with an additional solid electrolyte 1408 formed on the surface of the electrolyte 106. The inventors have discovered unique advantages in using a composite electrolyte formed from a combination of two types of solid inorganic electrolytes in some applications. For example, the composite electrolyte may include (i) a more hydroscopic and more ionically conductive electrolyte infiltrated into the electrode (e.g., as the first electrolyte 106) and (ii) a less ionically conductive but more stable coating on the surface of the hydroscopic electrolyte, protecting it from the environment (e.g., as the second electrolyte 1408). Examples of processes that can be utilized to deposit this second protective layer of the composite solid electrolyte include RF magnetron sputtering, pulse laser deposition (PLD), electron beam evaporation, ion beam processes, atmospheric or low pressure chemical vapor deposition, various other vacuum deposition methods, various plasma-enhanced deposition processes, various physical vapor deposition and sputtering processes, and others. An oxide-based solid inorganic electrolyte can be used as a second protective electrolyte layer. In some examples, a polymer solid electrolyte can be used instead of the oxide-based solid inorganic electrolyte as a surface protective layer. In some examples, a thin metal ion permeable metallic film can serve as a protective layer. A thin nickel metal coating and a thin copper metal coating are examples of such a metallic layer for Li-ion or Li-metal batteries.

Oxide-based solid inorganic electrolytes (such as NASICON-structured $LiTi_2(PO_4)_3$, Li—P—O, borates ($xLi_2O$—$B_2O_3$), silicates ($Li_2O$—$SiO_2$—$V_2O_5$), lithium phosphorus oxynitride (LiPON), to name a few) typically offer lower ionic conductivity than those not based on oxides, such as $Li_3N$, $Li_2S$, $Li_2S$—$SiS_2$—$P_2S_5$, and $Li_2S$—$P_2S_5$. Electrolytes that are not based on oxides (such as sulfide-based electrolytes) may exhibit a lower melting point and, in some cases, be less brittle than oxide-based electrolytes, which is advantageous in some applications. The main advantage of oxide-based solid inorganic electrolytes, however, is significantly better room temperature stability in dry air and in regular air. Sulfide-based electrolytes, in contrast, exhibit higher ionic conductivity, but are very hydroscopic and sensitive to dry air.

Figure 15:
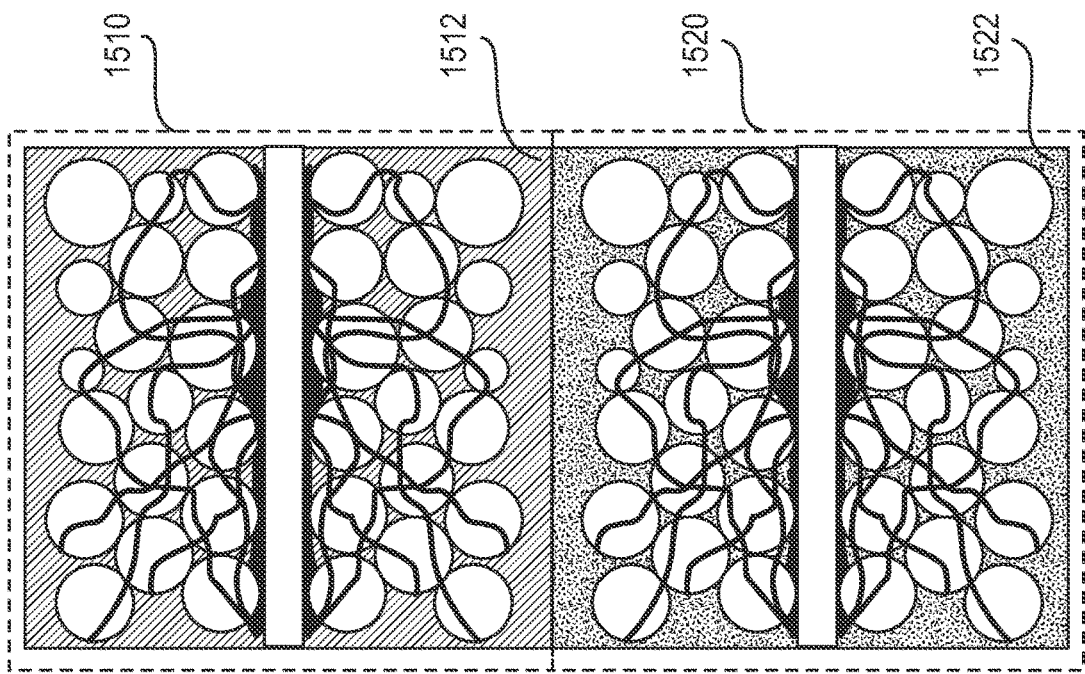
FIGS. 14-18 illustrate example metal or metal-ion battery compositions having a composite electrolyte according to various embodiments.

FIG. 15 illustrates another example metal or metal-ion battery composition having a composite electrolyte according to various embodiments. In this example, one type of electrolyte 1512 is used for the anode 1510 and another type of electrolyte 1522 is used for the cathode 1520. In some applications, it may be advantageous to use one type of electrolyte for the anode and another type for the cathode. For example, some solid electrolytes (e.g., the titanium-containing oxide-based electrolytes or some polymer electrolytes) may not be stable at the anode or exhibit high resistance of the anode/electrolyte interface (or interphase, if the electrolyte reacts with the anode), while some other solid electrolytes (e.g., sulfur-containing electrolytes and some polymer electrolytes) may exhibit high resistance of the cathode/electrolyte interface (or interphase, if the electrolyte reacts with the cathode) or even suffer from low stability against oxidation at a cathode (e.g., in the case of some polymer electrolytes in contact with some oxide-based cathodes). By using different electrolytes, the anode 1510 may be infiltrated with the electrolyte 1512 selected to be more favorable for the anodes, while the cathode 1520 may be infiltrated with the other electrolyte 1522 selected to be more favorable for cathodes.

Figure 16:
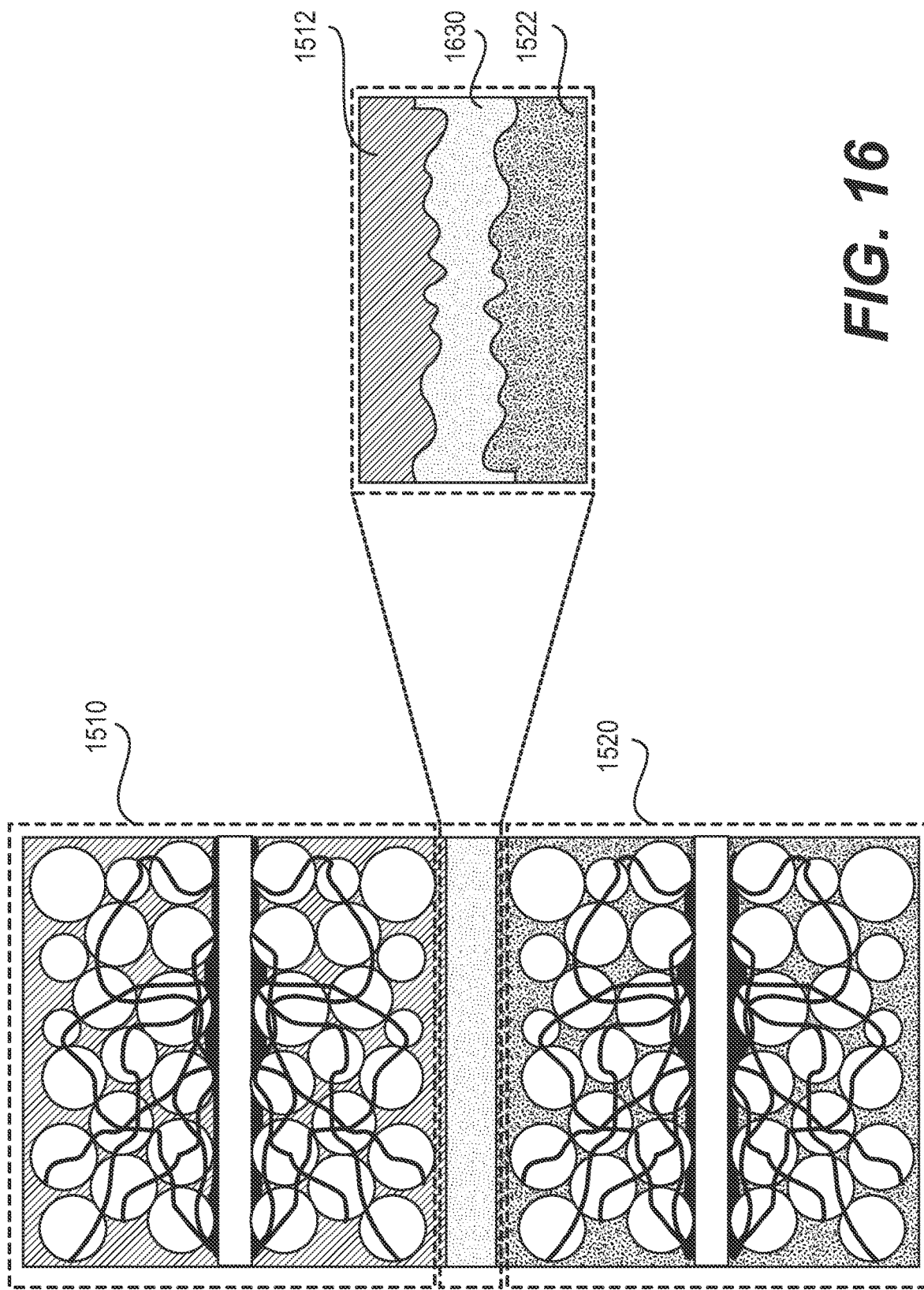

FIG. 16 illustrates another example metal or metal-ion battery composition having a composite electrolyte according to various embodiments. This design is similar to that of FIG. 15, with an intervening layer 1630. In some applications, it may be further advantageous to utilize a third metal ion permeable material to stack electrodes infiltrated with electrolyte together to form a battery cell having smaller overall resistance and avoid the diffusion barrier for metal ions at the interface of the anode and cathode electrolytes. Such an interlayer material should form a low resistance interface with each electrolyte. In some applications, it may be advantageous for such an interlayer to be mechanically soft (plastically deformable) in order to form void-free interfaces. In particular, it may be advantageous for such an interlayer to have a melting or glass transition point below 400° C., or more preferably below 250° C. A polymer electrolyte is an example of such a layer. In some applications, a liquid electrolyte is another example of such a layer. In this case, it is important that both of the solid electrolytes are compatible with the liquid electrolyte. It is important that both anode and cathode are electrically insulated from each other. However, if the solid electrolyte(s) completely covers the surface of at least one electrode, such an interlayer may exhibit mixed conductivity (such as being electrically and ionically conductive). Examples of such mixed conductors for Li ions include metals or carbon. However, in some applications it is advantageous for this interlayer to have small (e.g., less than 10%, or preferably less than 5%) volume changes during the transport of metal ions through it in order to provide mechanical stability to the anode-electrolyte1-interlayer-electrolyte2-cathode stack and the cell. In some applications, it may be advantageous for an interlayer to be used even if the solid electrolytes on both the anode and the cathode are identical.

Figure 17:
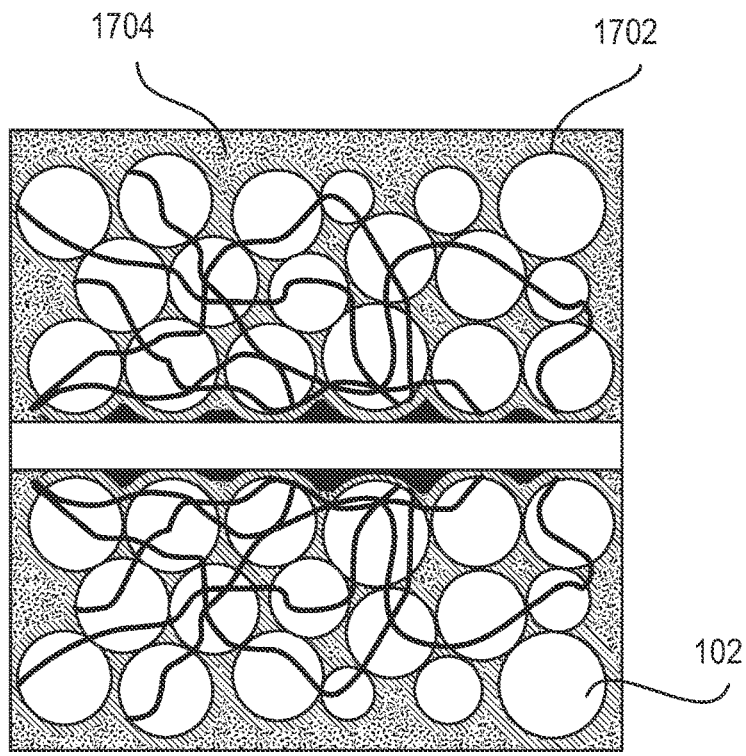

FIG. 17 illustrates another example metal or metal-ion battery composition having a composite electrolyte according to various embodiments. In this example, a first solid electrolyte 1702 is provided as a thin, conformal coating on the active particles 102 and a second solid electrolyte 1704 is provided elsewhere as shown. The first (thin) solid electrolyte layer 1702 can be deposited on the particles by various methods. The coating can be made by physical or chemical vapor deposition. Atomic layer deposition is another suitable method. In the case of a soluble solid electrolyte, a thin conformal layer can be deposited onto the particles by spaying, dip-coating, etc. In some applications, it may be advantageous (e.g., for protection from an oxygen-containing environment, for overall increase in ionic conductivity, or for the overall enhancement of mechanical stability) for the first solid electrolyte 1702 to only form a thin (e.g., on the order of 5-50 nm) conformal coating on the surface of the electrically interconnected active particles of the anode and cathode (that is, conformal coatings on the surface of at least one of the porous electrodes).

Figure 18:
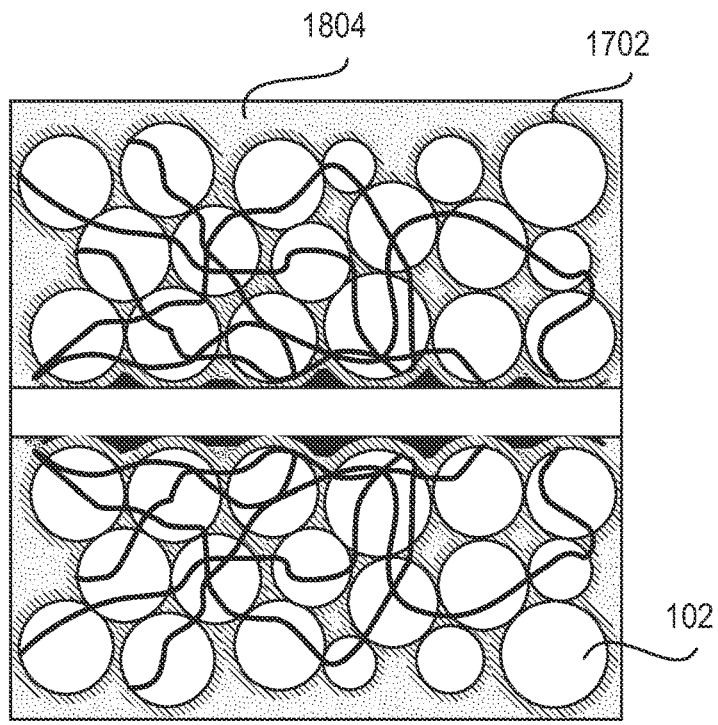

FIG. 18 illustrates another example metal or metal-ion battery composition having a composite electrolyte according to various embodiments. This design is similar to that of FIG. 17, except that the second solid electrolyte 1704 is replaced with a different type of second electrolyte 1804. In some applications, it may be advantageous to use of a liquid electrolyte, which may have significantly higher conductivity or be easier to infiltrate into the electrodes. In some cases, it may be advantageous to use a polymer electrolyte or polymer electrolyte containing ceramic nanoparticles instead of the liquid electrolyte. In some cases, it may be advantageous to use ionically conductive ceramic nanoparticles within this polymer electrolyte. Such particles may enhance mechanical strength and the elastic modulus of the electrolyte, or enhance electrolyte conductivity.

In each of the above-described examples, a portion of the solid electrolyte can be used as an active material for metal ion storage. For example, a portion of an $Li_2S$ or $Li_2S$—$P_2S_5$ electrolyte can be used to store Li ions for Li-ion or Lithium batteries. That is, with reference to FIG. 1, the shape, constitution, and arrangement of the active particle structures 102 may be configured to facilitate additional ion storage within the solid electrolyte 106.

FIGS. 19-32 illustrate various example metal or metal-ion battery compositions with structural arrangements configured to facilitate additional ion storage within the solid electrolyte according to various embodiments. In the different designs, an "ion storage portion" of a solid electrolyte 1904 may be infiltrated into an electrically conductive matrix material 1902 having interconnected pores. In some of the designs, a second electrolyte 2006 is additionally provided. FIGS. 33-37 illustrate various examples of different backbone structures that may be used to support the arrangements in FIGS. 19-32. The electrically conductive matrix provides a path for electrons, facilitating the electrochemical oxidation/reduction processes within the solid electrolyte and thus providing for reversible ion storage. It also provides mechanical reinforcement, and prevents changes in the electrode dimensions during insertion and extraction of ions.

In some applications, it may be advantageous for the electrically conductive material to have pores in the range of about 0.3 nm to about 3,000 nm (3 microns), and preferably in the range of about 1 nm to about 1,000 nm (1 micron). In some applications, it may be advantageous to incorporate conductive (nano)particles into the solid electrolyte when pores in the range of about 50 nm to about 3,000 nm exist in the electrically conductive electrode matrix.

One example material for use in the electrically conductive electrode matrix is carbon. In some applications, such as when carbon would react with a solid electrolyte at elevated temperatures as in some melt-infiltration process or when carbon would have poor wetting with a solid electrolyte or a solid electrolyte solution, it may be advantageous to coat the carbon with an additional surface layer, disposed at the interface between the carbon and the solid electrolyte after solid electrolyte infiltration.

Figure 19:
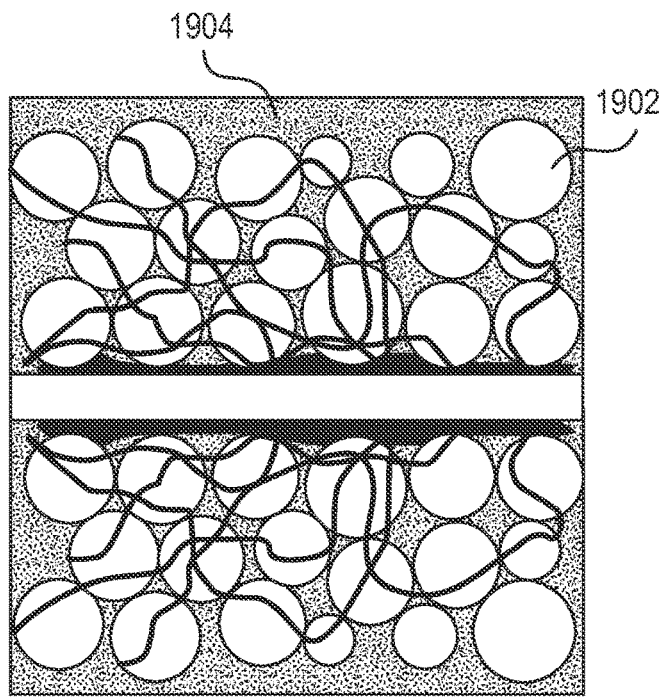
FIGS. 19-32 illustrate various example metal or metal-ion battery compositions with structural arrangements configured to facilitate additional ion storage within the solid electrolyte according to various embodiments.
Figure 20:
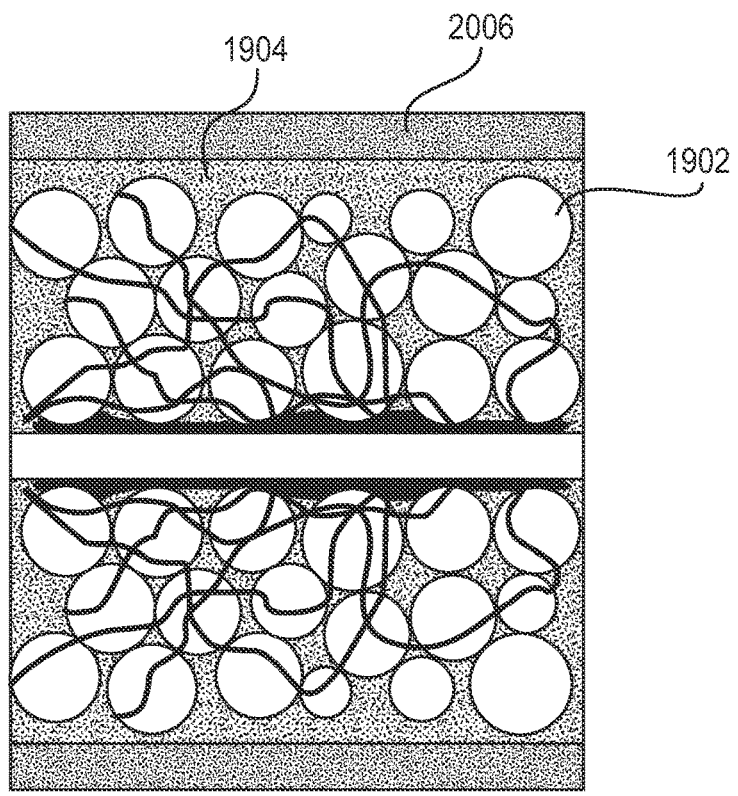
Figure 21:
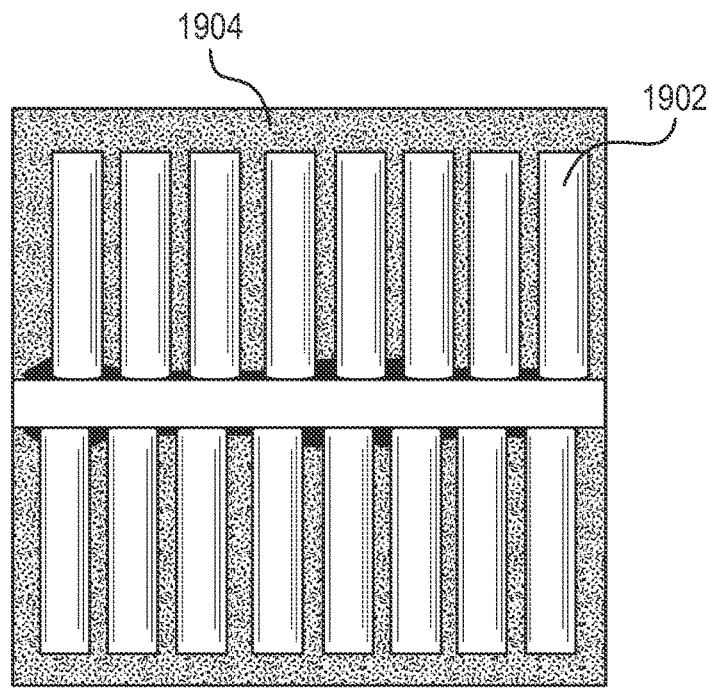
Figure 22:
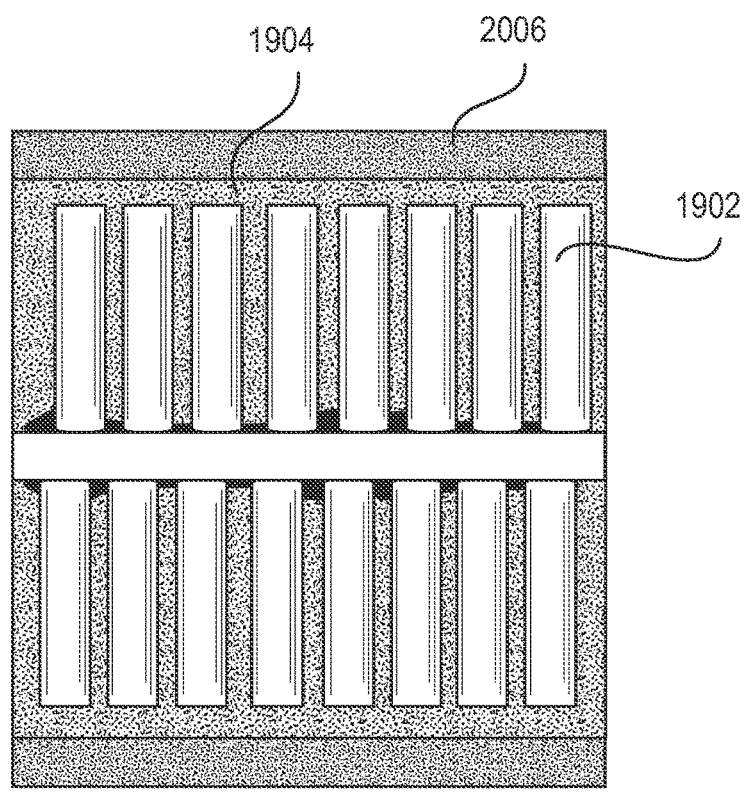
Figure 23:
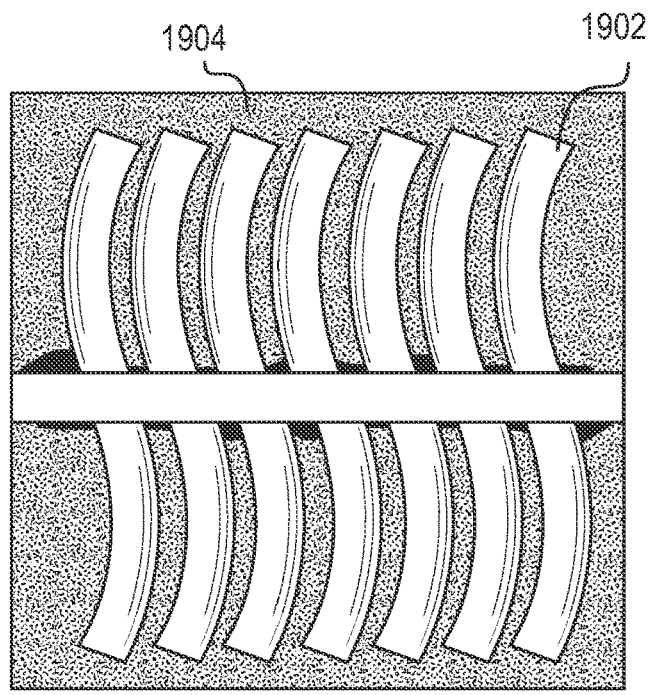
Figure 24:
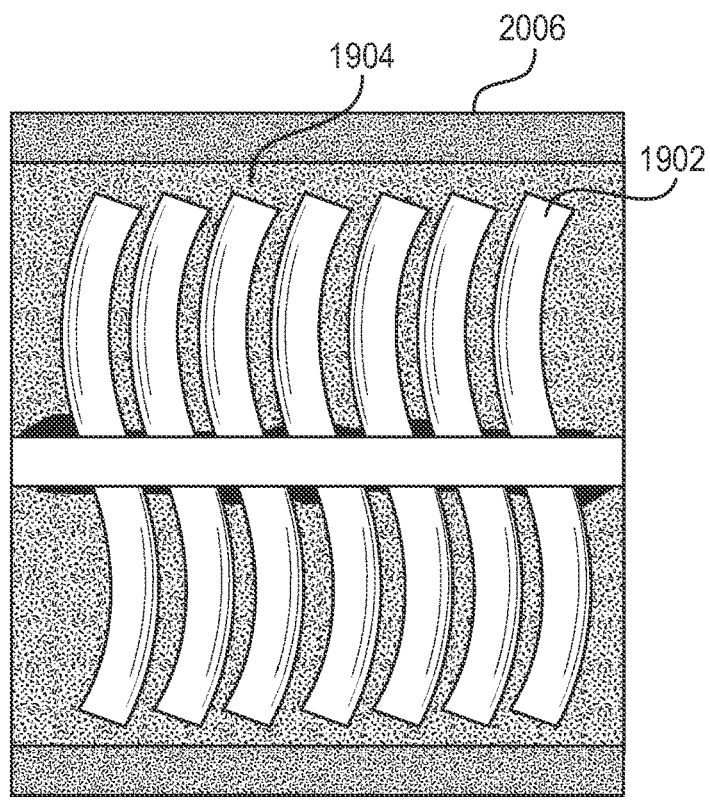
Figure 25:
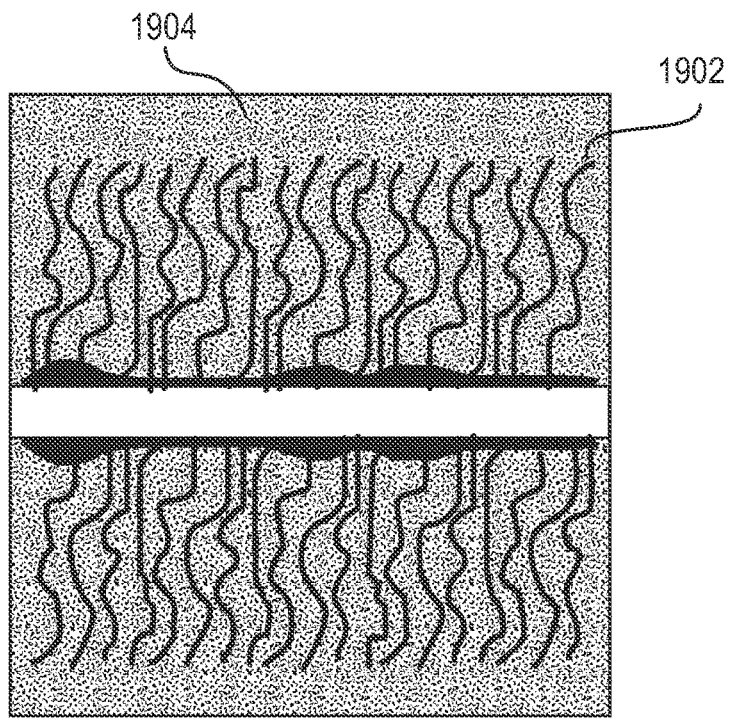
Figure 26:
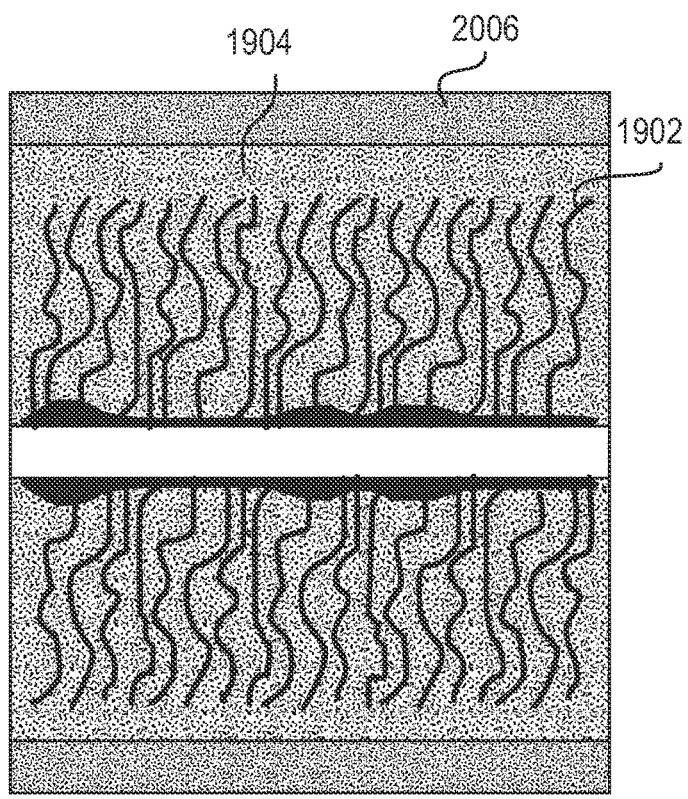
Figure 27:
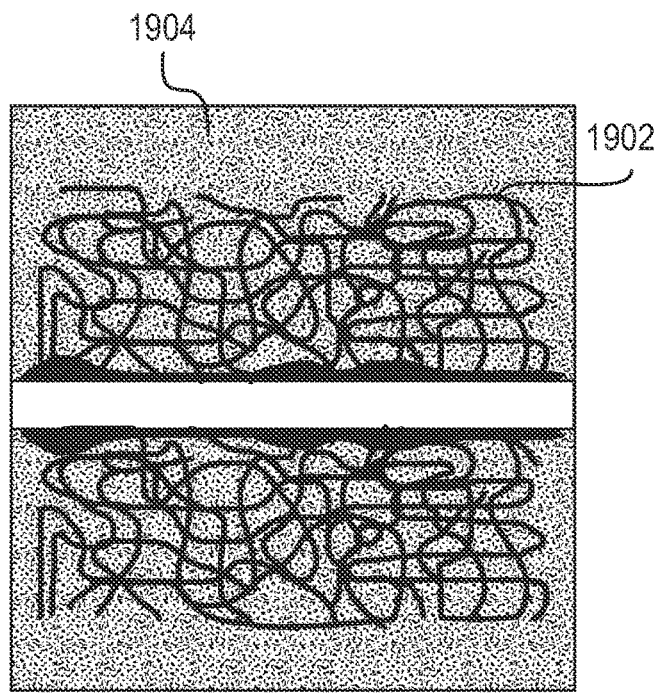
Figure 28:
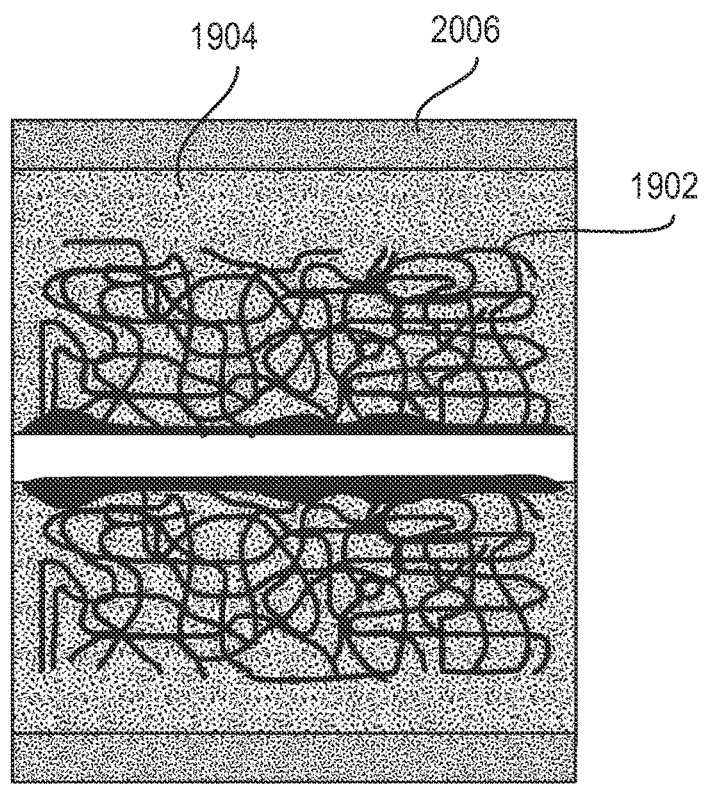

Returning to FIGS. 19-36, in some applications, it may be advantageous for the matrix material to be composed of individual particles electrically connected with a thermally stable carbonized binder (FIGS. 19-20). In some applications, it may be advantageous for these particles to be essentially spherical (FIG. 19-20). In some applications, it may be advantageous for these particles to be cylindrical or elongated in shape (FIGS. 21-28). In this case, higher electrical conductivity and better mechanical (structural) stability may be achieved. In some applications, it may be advantageous to have low tortuosity for the path of metal ions, such as in the case where elongated particles exhibit some degree of vertical alignment (FIGS. 21-26). In this case, shorter average ion diffusion lengths may lead to higher power performance. In some applications, it may be advantageous for this matrix material to form a continuous porous film with open interconnected porosity and pore size sufficiently small to utilize a significant amount (e.g., over about 80%) of the available ion storage capacity of electrolytes at charge-discharge rates used in a given application (FIGS. 27-32). In this case, higher (compared to the case when some of the pores between conductive particles are too large) volumetric capacity may be achieved. If a larger space existed between the individual particles, the electrolyte in such a space may not be fully utilized for ion storage (because the high electrical resistance of the electrolyte with no conductive matrix prevents reduction/oxidation reactions from taking place).

Figure 29:
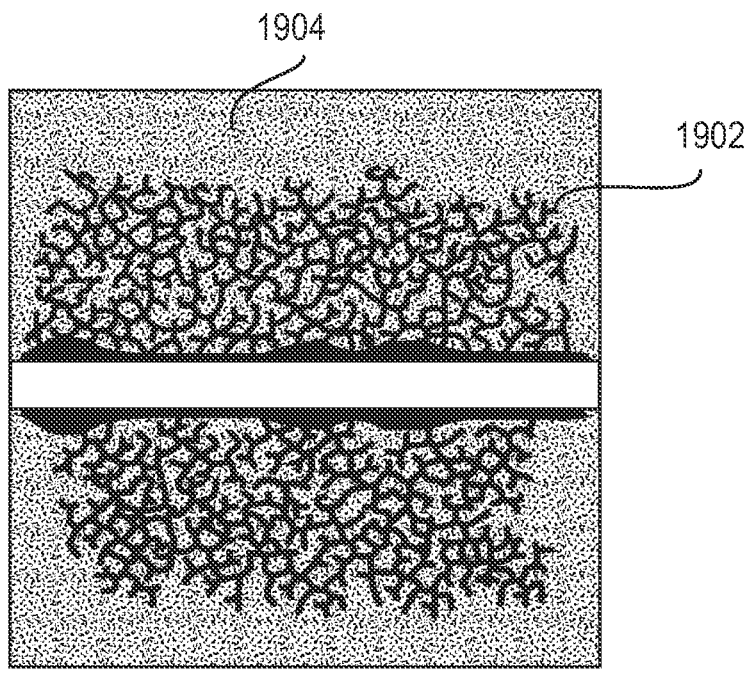
Figure 30:
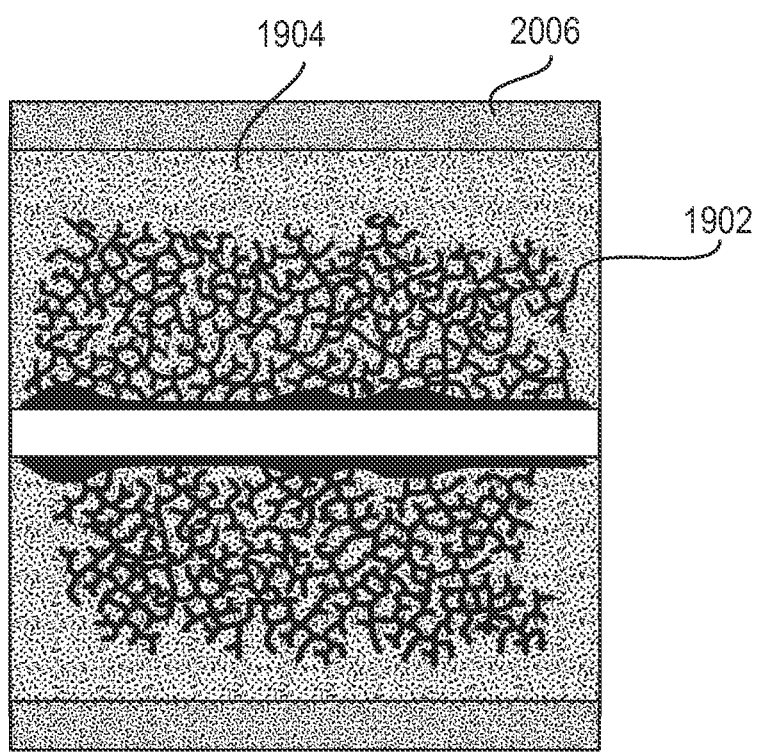
Figure 31:
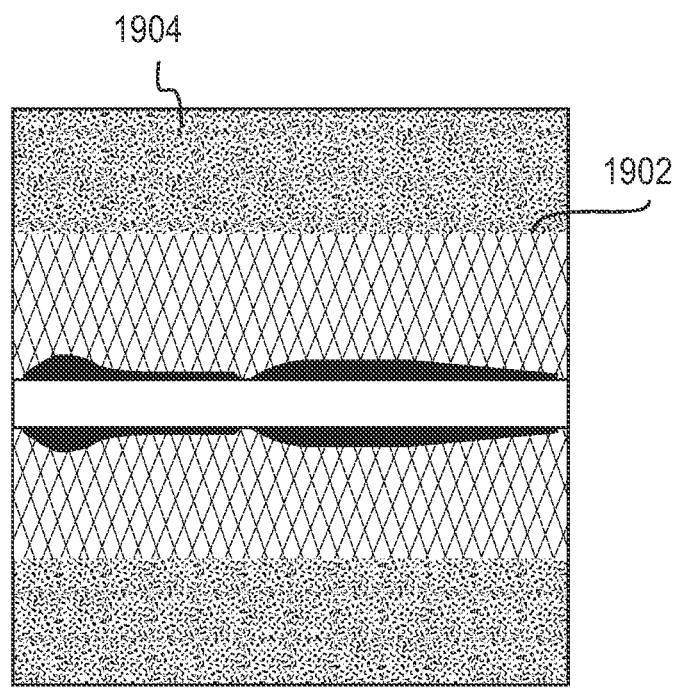
Figure 32:
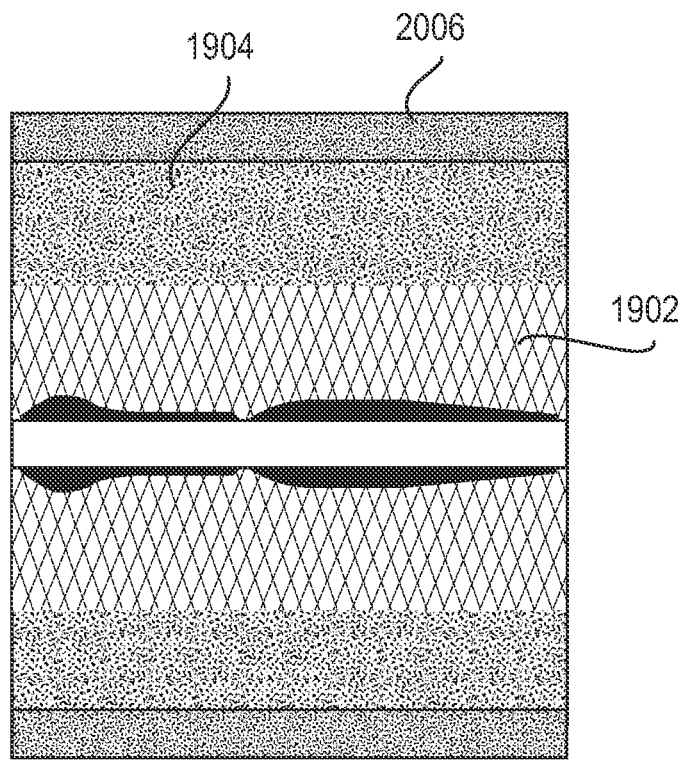
Figure 33:
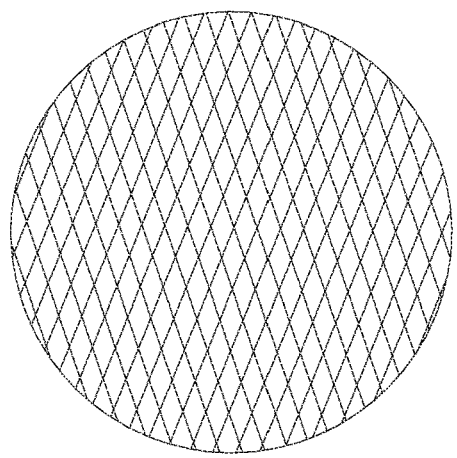
FIGS. 33-37 illustrate various examples of different backbone structures that may be used to support the arrangements in FIGS. 19-32.
Figure 34:
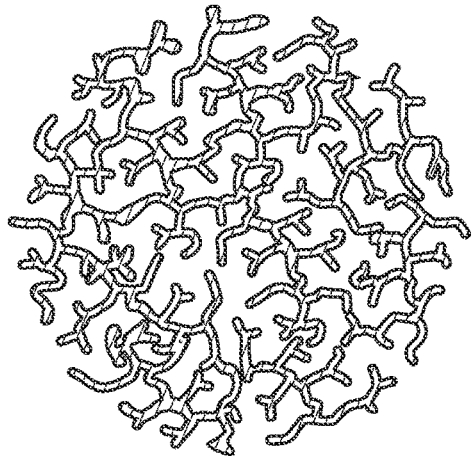
Figure 35:
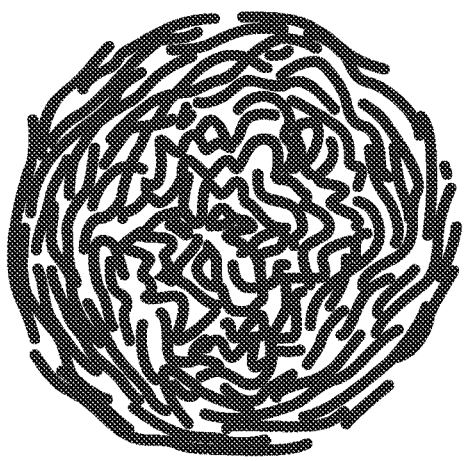
Figure 36:
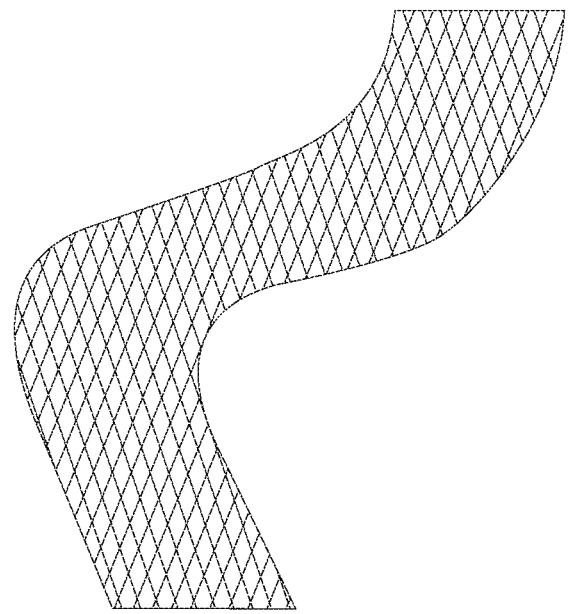
Figure 37:
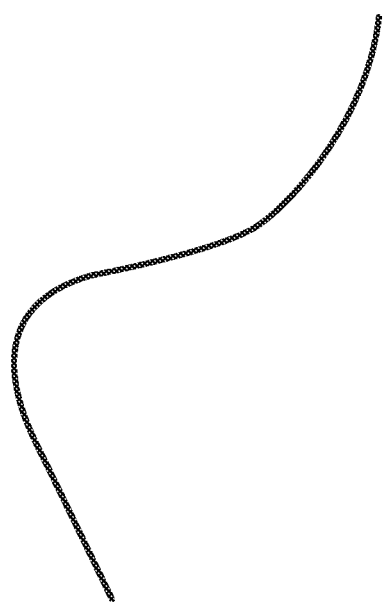

The distribution of the inner pore(s) within the electrically conductive matrix particles or films may also vary. In some applications, it is advantageous to create sufficient porosity within the particles' (FIGS. 19-24, FIG. 33-36) or film's (FIGS. 31-32) volume to incorporate the active (ion storage) portion of an inorganic electrolyte. In some applications, it may be advantageous for the electrically conductive porous matrix particle or film to comprise a porous scaffolding of electrically conductive material (FIGS. 33 and 36). In some applications, it may be advantageous for the electrically conductive porous matrix particle or film to comprise a porous composite of a backbone composed of connected nanoparticles of electrically conducting material (FIG. 34, FIGS. 29-30). In some applications, it may be advantageous for this backbone to have a hierarchical or dendritic morphology. In some applications, it may be advantageous for the electrically conductive porous matrix particle or film to comprise interconnected curved layers of electrically conductive material (FIG. 35). In some applications, it may be advantageous for the conductive matrix particles to not be porous themselves (FIG. 37), but electrically connected to the current collector or each other and spaced close to each other (with a particle-free space in the solid electrolyte being less than 3 microns on average, and preferably less than 1 micron on average or even less than 200 nm on average) (FIGS. 25-30).

Example Production Process #1

Figure 38:
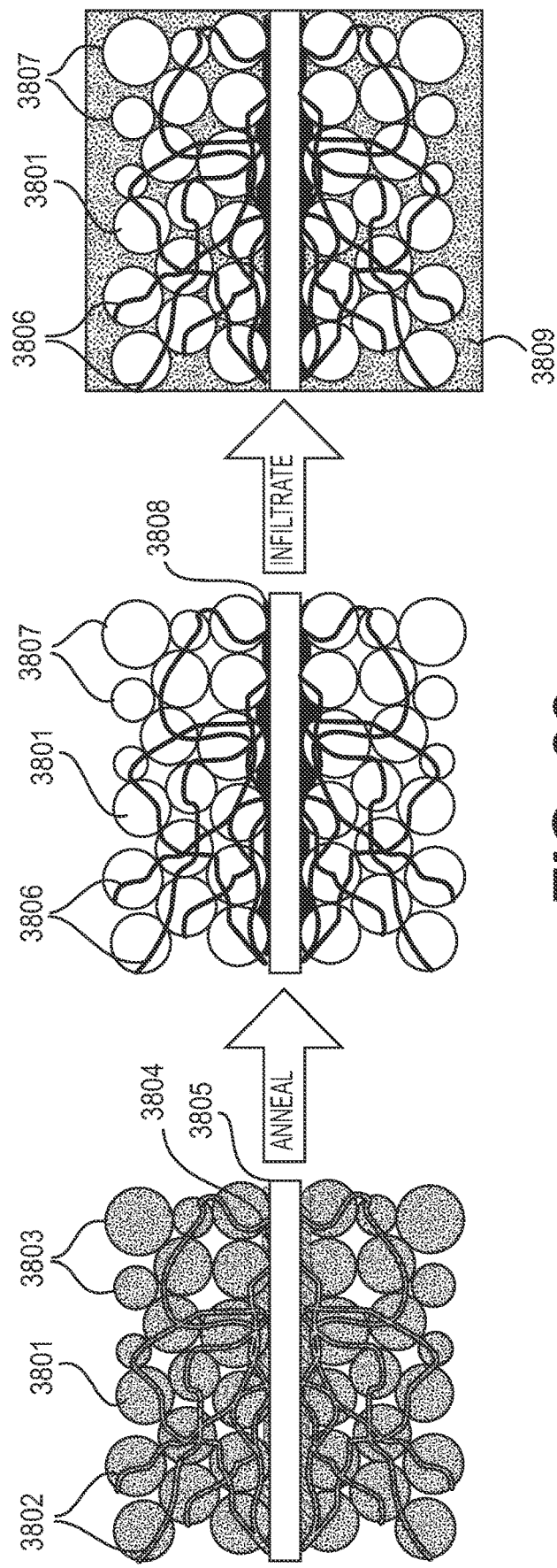
FIG. 38 is a structural flow diagram illustrating an example production process for fabricating a metal or metal-ion battery composition of the type shown in FIG. 1.

FIG. 38 is a structural flow diagram illustrating an example production process for fabricating a metal or metal-ion battery composition of the type shown in FIG. 1. According to certain embodiments, the active (composite) particles 3801 may first be mixed with an organic binder solution 3803 that can carbonize (transform into conductive carbon upon heating). A polymer dissolved in a solvent (such as polyacrylic acid, PAA, dissolved in water or polyvinylidene fluoride, PVDF, dissolved in n-methylpyrrolidone, NMP) is an example of such a binder. The produced slurry may then be cast on a thin sheet or foil, such as a current collector 3805. In some applications, it may be advantageous to apply an additional multi-functional organic adhesive layer 3804 near the electrode-foil interface to increase the bonding between the electrode and the foil. In some applications, this adhesive layer may be of the same chemistry as the binder. In some applications, it may also be advantageous to add polymer (nano)fibers, carbon (nano) fibers, or carbon nanotubes 3802 to the slurry and thus incorporate them into the pre-formed electrolyte-free electrode.

Subsequently, the electrode may be annealed (heat-treated) to transform the soft organic binder 3807, polymer fibers 3806, and organic adhesive layer 3808 into rigid, thermally stable, and electrically conductive carbon (mostly $sp^2$-bonded). In some applications, it may be advantageous to add a catalyst into the organic binder solution to reduce the carbonization temperature. Sulfuric acid ($H_2SO_4$) is an example of such a catalyst. In some applications, it may be advantageous to perform annealing (heat treatment) in an inert environment, such as $N_2$ or Ar. The thermally stable carbonized binder and carbon fibers (or carbon nanotubes) incorporated into the formed electrode electrically and mechanically connect the active particles to each other and to the thin sheet/foil (e.g., current collector). The purpose of such a step is to increase thermal stability and chemical stability of the electrode during the subsequent coatings with or infiltration with a solid electrolyte. Thus, when stability of the electrode is sufficient for solid electrolyte infiltration or coating(s), such a step can be omitted.

In this example, the thermally-stable and electrically connected electrode is then melt-infiltrated with an electrolyte 3809 (at above the electrolyte glass transition temperature) and cooled down to room temperature to form an inorganic solid-electrolyte-comprising composite electrode. In some applications, it may be advantageous to cool down the electrolyte-infiltrated electrode quickly to retain the electrolyte glassy structure (i.e., to minimize crystallization). In some applications, it may be advantageous to coat the active particles with a layer that has good wetting properties with the molten electrolyte. In some applications, it may be advantageous to add several different network modifiers into the electrolyte melt in order to reduce its viscosity at the infiltration temperature. In some applications, it may be advantageous to add a compound into the electrolyte that enhances its wetting on the surface of the active particles.

As discussed above, in some applications, it may be advantageous to produce thin conformal metal ion permeable coating(s) on the electrode surface (around each individual particle, electrically connected within the electrode) prior to coating with or infiltrating with a solid electrolyte in order to reduce the resistance of the electrode/electrolyte interface. In some applications, it may be advantageous for such coatings to be electrically insulative in order to prevent, for example, a formation of ion-depleted regions near the electrode/electrolyte interface.

In some cases, by the addition of a higher (non-stoichiometric) concentration of metal into the electrolyte melt (for example, by adding Li into the $Li_2S$—$P_2S_5$ molten mixture), metal can be incorporated into the electrode (e.g., to lithiate the electrode) during the electrolyte melt-infiltration process. Once the electrode/electrolyte composite is cooled down, the lithiated electrode will be protected from the surroundings by the layer of inorganic solid electrolyte.

In some applications, it may be advantageous to first produce a stack (or a roll) composed of alternating layers, such as a thermally stable (at the temperatures of electrolyte infiltration) cathode (deposited on a thermally stable electrically conductive current collector), a thermally stable (at the temperatures of electrolyte infiltration) inorganic porous separator (such as a porous oxide sheet), and a thermally stable (at the temperatures of electrolyte infiltration) anode (deposited on a thermally stable electrically conductive current collector), and then melt-infiltrate the assembly with an inorganic electrolyte heated above its glass transition temperature.

In some applications, it may be advantageous to use a current collector comprising carbon. In some applications, it may be advantageous to have such an assembly enclosed in a thermally stable housing (such as a thermally stable prismatic or cylindrical cell) prior to the melt-infiltration. In some applications, it may be advantageous to keep the temperature of the stack and (if used) the housing above the melting point (or above the glass transition point) of the solid electrolyte during the melt infiltration process. In some applications, it may be advantageous to perform the melt-infiltration under vacuum or expose the hot melt-infiltrated stack (or the whole cell) to vacuum to minimize the amount of voids remaining within the melt-infiltrated assembly (stack).

Example Production Process #2

According to other example embodiments, the solid inorganic electrolyte (such as $Li_2S$—$P_2S_5$ with or without dopants) may first be dissolved in solvent and infiltrated either within the electrode (for example, the one schematically shown in FIG. 38) or within the top (shell) porous layer of the individual particle (such as a porous layer schematically shown in FIGS. 5, 8, 11, 13).

Solution-based coating methods offer a pathway to overcoming certain drawbacks of melt-infiltration methods. For instance, by controlling the chemical composition of a solution phase, the chemistry of a formed film may be controlled with higher precision. Multiple infiltration procedures with different compositions can be repeated in series to create a complex solid electrolyte distribution within the electrode. Techniques such as spray-coating, spin-coating, or dip-coating may be used over not only flat but highly varied surfaces by taking advantage of the surface tension of the solution, and can be suitable for large surface areas and/or high production volumes. In addition, the elimination of high temperatures during melt infiltration can allow for higher production rates and simpler processing as compared to previous systems.

A suitable solvent for the solid electrolyte may generally include any organic liquids that can contain N—H bonds. In one embodiment, the solvent can be selected with basis properties that, for example, avoid the formation of oxides during solution formation. For instance, the solvent can include a primary or secondary amine.

The solid electrolyte solution can be formed by dissolution of the solid electrolyte with a solvent such as propylamine, butylamine, diethylamine, pyridine, aniline, ethylenediamine, pyrrolidine, pyrrole, piperidine, piperazine, ethanolamine, morpholine, hydrazine, and generally any liquid containing labile N—H bonds. N—H bonds, however, need not necessarily be a structural element of the solvent molecule. Polar solvents, dimethylsulfoxide, dimethylformamide, prophylene carbonate, and acetonitrile, to mention a few, can be used as a solvent media with the addition of N—H containing molecules. To avoid hydrolysis of the solid electrolyte, dissolution can be performed in a dry solvent (e.g., dried over molecular sieves), and under an inert atmosphere. In some examples (e.g., in the case of an $Li_2S$-based electrolyte for Li-ion or lithium batteries) dry ethanol or dry methanol may serve as a solvent for the electrolyte.

For example, the electrode (e.g., as schematically shown in FIG. 38) or the top (shell) porous layer of the individual particle (such as the porous layer schematically shown in FIGS. 5, 8, 11), can be infiltrated with a solution of a solid electrolyte $Li_2S$—$P_2S_5$ in the selected solvent by dip-coating. In some embodiments, the concentration of $Li_2S$—$P_2S_5$ can be in the range of approximately 1%-50%, but preferably approximately 10%-40%. To reduce pore formation after solvent evaporation, sub-micron size (or sub-100 nm size) particulates can be added to the solution of a solid electrolyte. After drying in an inert environment, active particles (either individual or agglomerated or connected within the electrode) coated with an inorganic ceramic solid electrolyte layer are obtained. The infiltration/drying procedure can be repeated multiple times to reduce the remaining pore volume and coat a majority of the particle(s) outer surface. While some of the pores may remain, they can be later filled with a polymer electrolyte, organic electrolyte, or ionic liquid electrolyte.

The thus produced composite electrode(s) exhibit a unique combination of properties, including: (1) high coulombic efficiency, since the inorganic electrolyte does not decompose on the particle surface at low or moderately high potentials; (2) high voltage stability, in that batteries produced with such a composite electrode and combination of solid electrolytes (or solid and liquid electrolytes) exhibit higher voltage and thus higher energy density when only an inorganic electrolyte directly contacts the electrode; (3) high rate capability in batteries, in that if a liquid organic electrolyte is used for filling the remaining pores, then the batteries produced with such composite electrode(s) may exhibit high rate capability (assuming the ionic conductivity of the liquid electrolyte is higher than that of the solid electrolyte); and (4) high ductility and flexibility (compared to only a solid electrolyte), in that if a polymer electrolyte is used for filling the remaining pores, then the produced composite will retain some flexibility and may even be tailored to have higher fracture toughness.

As discussed above, in some applications, it may be advantageous to deposit a protective thin surface electrolyte layer (e.g., less than about 5 microns, and preferably less than about 1 micron) can be deposited on the top electrode surface (as illustrated in FIG. 14, for example). In some cases, when the protective film has small metal ion conductivity, its thickness may be made as small as 2-50 nm.

Further, as also discussed above, in some applications, it may be advantageous for solid electrolyte(s) only to form thin (5-50 nm) conformal coatings on the electrode surface (with the rest of the volume between the electrodes being filled with a liquid electrolyte or another solid electrolyte). In order to form such a conformal coating on the electrode surface, a metal oxide electrolyte may be used in some applications. When a solution based method is utilized to form such a coating, metal ion delivery from the solution to the surface should be done by compounds with good film forming properties. Metal salts of organic acids or polymeric salts are good candidates for this purpose. Metal acetylacetonates are one of such example. Another example is utilization of metal salts of polymeric carboxylic acids such as polyacrylic acid, polymethacrylic acid, to mention a few. Metal oxide precursor(s) can be applied to the electrode by spraying, dip-coating, roll-to-roll coating with the solution of the metal oxide precursor. Once applied to the electrode, the metal precursor can be converted into an oxide film by, for example, exposure to a basic compound, such as ammonia vapors or low molecular weight amines (methylamine, dimethylamine, triethylamine, etc) in a humid environment (provided, of course, that the electrode to be coated is moisture tolerant). Base treatment will convert metal salts into metal hydroxide (oxide) nanoparticles or a dense film, conformably coating the surface of the electrode active material. Mild thermal treatment of the coating can be applied to convert metal hydroxide into an oxide.

Example Production Process #3

According to still other example embodiments, the solid inorganic electrolyte (such as $Li_2S$—$P_2S_5$ with or without dopants) may first be dissolved in, for example, an N—H containing solvent and mixed with a polymer also dissolved in the same or similar solvent(s). For example, solvents such as propylamine, butylamine, diethylamine, pyridine, aniline, ethylenediamine, pyrrolidine, pyrrole, piperidine, piperazine, ethanolamine, morpholine, hydrazine, and generally any liquid containing labile N—H bonds can be used. N—H bonds, however, need not necessarily be a structural element of the solvent molecule. Polar solvents, dimethylsulfoxide, dimethylformamide, prophylene carbonate, THF and acetonitrile, to mention a few, can be used as a solvent media with the addition of N—H containing molecules. To avoid hydrolysis of the solid electrolyte, dissolution can be performed in a dry solvent (e.g., dried over molecular sieves), and under an inert atmosphere.

Inclusion of one or more polymers into the solid electrolyte can improve processing methods as well as products formed from the composition solutions. For instance, inclusion of a polymer in a solution can improve the deposition process through better control of solution properties, can improve bonding of the solution to a surface of the particles, and can improve thermal expansion discrepancies between electrode particulates and the solid electrolyte, to name a few beneficial aspects.

In this example, the solution of an inorganic electrolyte mixed with a polymer is then infiltrated either within the electrode (e.g., the one schematically shown in FIG. 38) or within the top (shell) porous layer of the individual particle (such as the porous layer schematically shown in FIGS. 5, 8, 11, 13). A solid electrolyte/polymer hybrid for the infiltration formation process can include any polymer that can be co-dissolved with the solid electrolyte in a joint solvent. Alternatively, a separate polymer solution can be formed that can be combined with the solid electrolyte solution prior to the infiltration procedure. In this case, the polymer solvent can be the same or different as the solid electrolyte solvent, though the two solutions should be miscible.

In some cases, it may be preferred to utilize a polymer that includes N—H bonds. Exemplary polymers include, without limitation, polyethyleneimine, polyallylamine (PAA), polyacrylamide (PAM), poly(N-isopropyl polyacrylamide) (PNIPAM), and the like. The polymer can be included in the solid electrolyte solution, in which case the same solvent can be utilized for both the polymer and the solid electrolyte. In other embodiments, the polymer need not include an N—H bond to stabilize the hybrid film, and can be any polymer that can be co-dissolved with the solid electrolyte. In other cases, polymer conductivity can be increased by the introduction of strong acidic groups, which can form salts with, for example, Li ions into a polymer structure. Examples of such groups include, but are not limited to —$CF_2SO_3H$ and —$SO_3H$.

In some applications, it may be advantageous if the polymer also exhibits ionic conductivity (for ions used in the batteries, such as Li ions in the case of Li-ion or Li batteries). In some cases, higher conductivity in the polymer can be obtained by dissolving metal ion salts in such a polymer.

After drying in an inert environment, particles (either individual or agglomerated or connected within the electrode) coated with an "inorganic ceramic solid electrolyte-polymer" (nano)composite layer are obtained. The infiltration/drying procedure can be repeated multiple times to reduce the remaining pore volume and coat a majority of the particle(s) outer surface. While some of the pores may remain, they can be later filled with a polymer electrolyte. In some applications, it may be advantageous to heat-treat the electrode after the electrolyte infiltration in order to enhance the conductivity across the electrode/electrolyte interface and polymer electrolyte/ceramic electrolyte interfaces. In some applications, it may be advantageous to perform heat-treatment under pressure to further enhance the properties of such interfaces, improving mechanical and ionic conductance properties of the cell.

In some applications, the metal ion conductive polymer (polymer electrolyte) containing solid ceramic electrolyte particles can be melt-infiltrated (as opposed to being solution infiltrated) into the electrode, as discussed above. In some applications, it may be advantageous to heat-treat the electrode after the infiltration in order to enhance the conductivity across the electrode/electrolyte interface and polymer electrolyte/ceramic electrolyte interfaces. In some applications, it may be advantageous to perform heat-treatment under pressure to further enhance the properties of such interfaces, improving mechanical and ionic conductance properties of the cell.

The advantage of this example approach to forming a polymer-ceramic composite electrolyte lies in the improvement in the mechanical properties (such as increased ductility and fracture toughness) of the composite electrode compared to the electrode filled with a relatively brittle solid inorganic electrolyte. In some cases, this approach also improves the rate capability of the electrodes when used in batteries.

In some embodiments, a combination of two of the example processes #1, #2 and/or #3 (or individual steps from some of these processes) described above may offer improved mechanical properties of the composite electrode compared to any of the processes alone, while offering advantages comparable to that described in processes #1 and #2. For example, if process #2 is used to create the first layer of inorganic electrolyte and process #3 is used to create the second and other inorganic-organic composite electrolyte layers, the result may provide improved mechanical properties of the composite electrode as compared to process #2 alone.

In some applications, it may be advantageous to deposit a protective thin surface electrolyte layer (e.g., less than about 5 microns, and preferably less than about 2 microns) on the top electrode surface (as illustrated in FIG. 14, for example).

Figure 39:
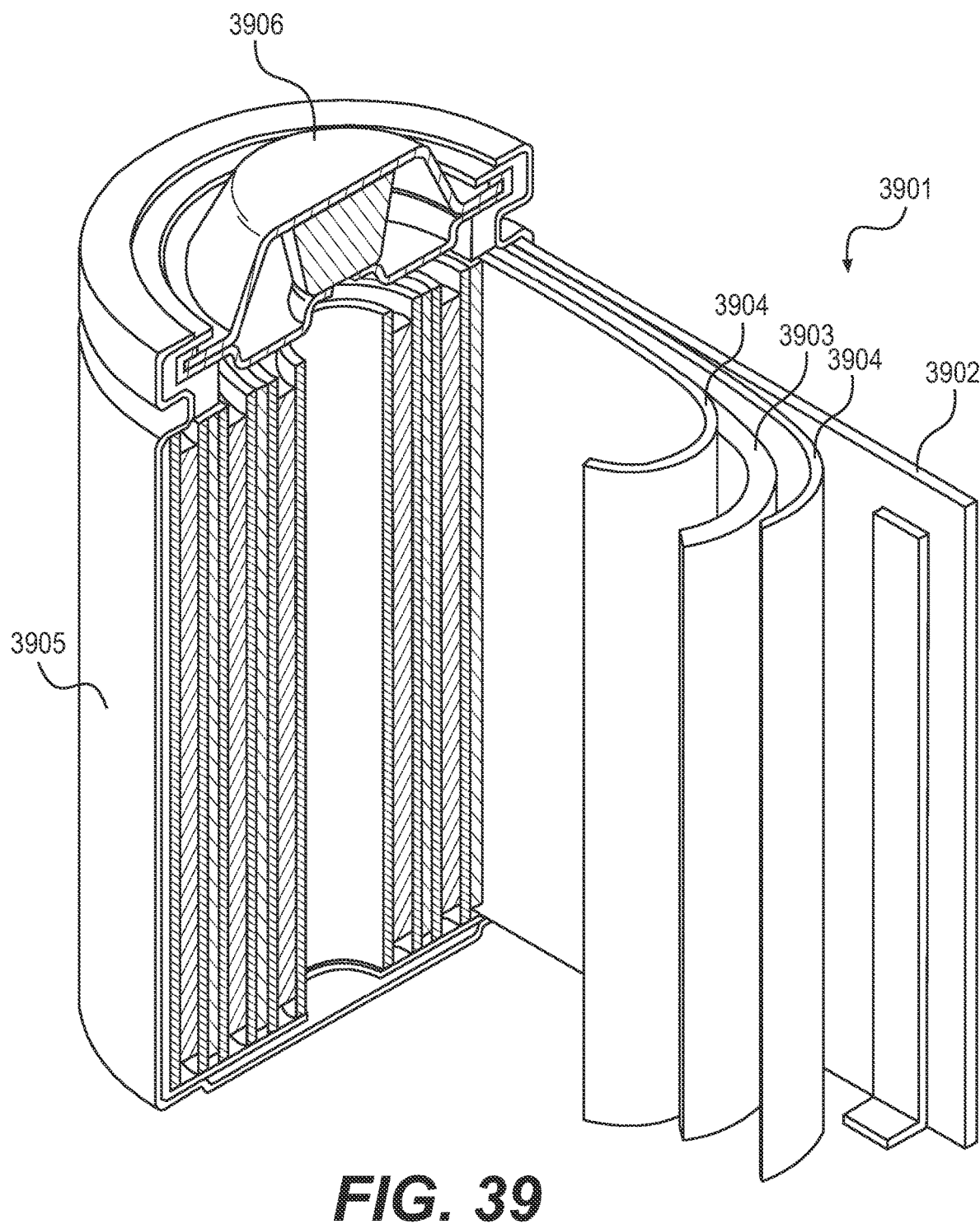
FIG. 39 illustrates an example metal-ion battery in which the components, materials, methods, and other techniques described herein, or combinations thereof, may be applied according to various embodiments.

Returning to the figures, FIG. 39 illustrates an example metal-ion battery (e.g., Li-ion) in which the components, materials, methods, and other techniques described herein, or combinations thereof, may be applied according to various embodiments. A cylindrical battery is shown here for illustration purposes, but other types of arrangements, including prismatic or pouch (laminate-type) batteries, may also be used as desired. The example battery 3901 includes a negative anode 3902, a positive cathode 3903, a separator 3904 interposed between the anode 3902 and the cathode 3903, an electrolyte impregnating the separator 3904, a battery case 3905, and a sealing member 3906 sealing the battery case 3905.

The forgoing description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention.

What is claimed is:

1. A metal or metal-ion battery composition, comprising:
   anode and cathode electrodes, wherein at least one of the anode and cathode electrodes includes active material particles comprising active material provided to store and release ions during battery operation, each of the active material particles including internal pores configured to accommodate volume changes of the active material during the storing and releasing of the ions; and
   an electrolyte ionically coupling the anode electrode and the cathode electrode, wherein the electrolyte comprises a solid electrolyte ionically interconnecting the active material particles,
   wherein the solid electrolyte comprises at least one solid electrolyte component, and
   wherein volume changes of the active material of the active material particles during the storing and releasing of the ions exceed about 10 vol. %.

2. The metal or metal-ion battery composition of claim 1, wherein the active material particles in the at least one electrode are substantially spherical.

3. The metal or metal-ion battery composition of claim 1, wherein the metal or metal-ion battery composition is configured to operate substantially stably during battery operation at or above +60° C.

4. The metal or metal-ion battery composition of claim 1, wherein the active material is arranged at least in part within the internal pores.

5. The metal or metal-ion battery composition of claim 1,
   wherein the solid electrolyte comprises a first solid electrolyte component infiltrated at the anode electrode,
   wherein the solid electrolyte comprises a second solid electrolyte component infiltrated at the cathode electrode, and
   wherein a liquid electrolyte interlayer separates the first solid electrolyte component from the second solid electrolyte component.

6. The metal or metal-ion battery composition of claim 1,
   wherein the solid electrolyte comprises a first solid electrolyte component that is arranged as a conformal coating on the active material particles of the anode electrode, the cathode electrode, or both, and
   wherein the solid electrolyte comprises a second solid electrolyte component that is separate from the conformal coating.

7. The metal or metal-ion battery composition of claim 6, wherein a thickness of the conformal coating is between 5-50 nm.

8. The metal or metal-ion battery composition of claim 1, wherein the solid electrolyte comprises a first solid electrolyte component impregnating the at least one electrode and a second solid electrolyte component formed on a surface of the first solid electrolyte component.

9. The metal or metal-ion battery composition of claim 8, wherein the first and second solid electrolyte components comprise different types of solid inorganic electrolyte.

10. The metal or metal-ion battery composition of claim 8, wherein the first solid electrolyte component is more hydroscopic and more ionically conductive than the second solid electrolyte component.

11. The metal or metal-ion battery composition of claim 8, wherein at least one of the first and second solid electrolyte components comprises a polymer solid electrolyte.

12. The metal or metal-ion battery composition of claim 1, wherein the at least one electrode is impregnated with the solid electrolyte.

13. The metal or metal-ion battery composition of claim 12, wherein the solid electrolyte impregnation into the at least one electrode is conducted via melt-infiltration or solution-based infiltration.

14. The metal or metal-ion battery composition of claim 12, wherein the solid electrolyte further comprises an organic electrolyte component.

15. The metal or metal-ion battery composition of claim 14, wherein the solid electrolyte comprises a polymer electrolyte.

16. The metal or metal-ion battery composition of claim 15, wherein the polymer electrolyte comprises one or more of F, S and N atoms.

17. The metal or metal-ion battery composition of claim 12, wherein the at least one electrode impregnated with the solid electrolyte is coated with a protective surface layer that physically separates the active material particles in the at least one electrode from the solid electrolyte.

18. The metal or metal-ion battery composition of claim 17, wherein a thickness of the protective surface layer is less than about 2 microns.

19. The metal or metal-ion battery composition of claim 18, wherein the thickness of the protective surface layer is less than about 1 micron.

20. The metal or metal-ion battery composition of claim 19, wherein the thickness of the protective surface layer is less than about 50 nm.

21. The metal or metal-ion battery composition of claim 1, wherein the (Original) metal or metal-ion battery composition is a lithium metal or lithium-ion battery composition.

22. The metal or metal-ion battery composition of claim 21, wherein the at least one electrode comprises the anode electrode.

23. The metal or metal-ion battery composition of claim 22, wherein the active material in the active material particles in the anode electrode comprises silicon.

24. The metal or metal-ion battery composition of claim 22, wherein the active material in the active material particles in the anode electrode comprises a lithium metal or a lithium metal alloy.

25. The metal or metal-ion battery composition of claim 22, wherein the anode electrode further comprises conductive additives in the form of carbon nanofibers, carbon nanotubes, graphene flakes, exfoliated graphite, or other types of conductive carbon particles or nanoparticles, or any combination thereof.

26. The metal or metal-ion battery composition of claim 22, wherein the active material particles in the anode electrode each comprise a porous, electrically-conductive scaffolding matrix within which the active material is disposed, wherein the scaffolding matrix structurally supports the active material, electrically interconnects the active material within the active material particles, and accommodates the volume changes of the active material during the storing and releasing of the ions.

27. The metal or metal-ion battery composition of claim 26, wherein the scaffolding matrix in the active material particles in the anode electrode comprises carbon.

28. The metal or metal-ion battery composition of claim 27, wherein the scaffolding matrix in the active material particles in the anode electrode comprises porous carbon.

29. The metal or metal-ion battery composition of claim 27, wherein the carbon within the scaffolding matrix in the active material particles in the anode electrode is carbonized from an organic precursor.

30. The metal or metal-ion battery composition of claim 29, wherein the organic precursor is a polymer.

31. The metal or metal-ion battery composition of claim 22, wherein the active material particles in the anode electrode are core-shell particles that each exhibits a core-shell structure.

32. The metal or metal-ion battery composition of claim 31, wherein a core in each of the active material particles in the anode electrode is porous.

33. The metal or metal-ion battery composition of claim 32, wherein the porous cores in the core-shell particles in the anode electrode are electrically conductive.

34. The metal or metal-ion battery composition of claim 32, wherein the porous core-shell particles in the anode electrode each comprise a porous shell.

35. The metal or metal-ion battery composition of claim 32, wherein a shell within at least one of the porous core-shell particles in the anode electrode comprises one or more layers.

36. The metal or metal-ion battery composition of claim 35, wherein at least one of the one or more layers in the shell of the at least one porous core-shell particle is deposited by chemical vapor deposition (CVD).

37. The metal or metal-ion battery composition of claim 35, wherein at least one of the one or more layers in the shell of the at least one porous core-shell particle is deposited by atomic layer deposition (ALD).

38. The metal or metal-ion battery composition of claim 35, wherein at least one of the one or more layers in the shell of the at least one porous core-shell particle comprises carbon.

* * * * *